(12) United States Patent
Nakajima et al.

(10) Patent No.: US 8,170,364 B2
(45) Date of Patent: May 1, 2012

(54) IMAGE PROCESSING METHOD, IMAGE PROCESSING DEVICE, AND IMAGE PROCESSING PROGRAM

(75) Inventors: Takeshi Nakajima, Hino (JP); Tsukasa Ito, Musashino (JP); Hiroaki Takano, Hachioji (JP); Daisuke Sato, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 806 days.

(21) Appl. No.: 11/919,949

(22) PCT Filed: Apr. 17, 2006

(86) PCT No.: PCT/JP2006/308013
§ 371 (c)(1),
(2), (4) Date: Dec. 15, 2008

(87) PCT Pub. No.: WO2006/120839
PCT Pub. Date: Nov. 16, 2006

(65) Prior Publication Data
US 2009/0116043 A1 May 7, 2009

(30) Foreign Application Priority Data
May 13, 2005 (JP) .................................. 2005-140870

(51) Int. Cl.
*G06K 9/40* (2006.01)
*G06K 9/00* (2006.01)
*H04N 1/60* (2006.01)

(52) U.S. Cl. ......................... 382/274; 382/128; 358/1.9

(58) Field of Classification Search .................. 382/274, 382/128, 162, 167, 282; 358/1.9, 518, 521; 348/234
See application file for complete search history.

(56) References Cited

U.S. PATENT DOCUMENTS

| 5,715,377 | A  | * | 2/1998 | Fukushima et al. ........... 358/1.9 |
| 2003/0020974 | A1 | * | 1/2003 | Matsushima .................. 358/521 |
| 2009/0073287 | A1 | * | 3/2009 | Shimizu ........................ 348/234 |

FOREIGN PATENT DOCUMENTS

| JP | 2000-148980 | 5/2000 |
| JP | 2000-278524 | 10/2000 |
| JP | 2003-69822 | 3/2003 |
| JP | 2004-297439 | 10/2004 |
| JP | 2006-39670 | 2/2006 |
| JP | 2006-94000 | 4/2006 |

* cited by examiner

*Primary Examiner* — Yon Couso
(74) *Attorney, Agent, or Firm* — Cozen O'Connor

(57) ABSTRACT

An image processing method includes the steps of: obtaining image data formed by signals of a plurality of pixels expressing a color image; discriminating a photographic scene of an image from the image data; determining a gradation correction method based on a result of discriminating a photographic scene; determining a first gradation correction amount based on a result of discriminating a photographic scene; detecting a face area in an image of the image data and calculating a face detection reliability; determining a second gradation correction amount based on an average luminance of the face area; determining a third gradation correction amount by weighted averaging the first gradation correction amount and the second gradation correction amount based on the face detection reliability; and applying a gradation correction process to the image data by using the third gradation correction amount and the gradation method.

3 Claims, 17 Drawing Sheets

GRADATION CORRECTION METHOD A
= PARALLEL TRANSLATION (OFFSET) CORRECTION

GRADATION CORRECTION METHOD B
= GAMMA CORRECTION

GRADATION CORRECTION METHOD C
= GAMMA CORRECTION + PARALLEL TRANSLATION (OFFSET) CORRECTION

BLOCK DIVISION

GRADATION CORRECTION CURVE

US 8,170,364 B2

IMAGE PROCESSING METHOD, IMAGE PROCESSING DEVICE, AND IMAGE PROCESSING PROGRAM

RELATED APPLICATIONS

This is a U.S. National Phase Application under 35 USC 371 of International Application PCT/JP2006/308013 filed on Apr. 17, 2006.

This application claims the priority of Japanese application no. 2005-140870 filed May 13, 2005, the entire content of which is hereby incorporated by reference.

TECHNICAL FIELD

The present invention relates to an image processing method, an image processing apparatus and an image processing program for executing an image process of color image data.

BACKGROUND TECHNOLOGIES

In recent years, digital still cameras (including a digital still camera configured into a cellular phone and a laptop computer, which will be called DSC (Digital Still Camera) hereinafter) have been widely spread out. As the same as a conventional system of a color film system, a system for outputting an image as a hard copy image, displaying the image onto a CRT (Cathode Ray Tube) or recording the image onto a recording medium, such as, CD-R (CD-Recordable) has been well known.

In many cases, it is difficult to form an optimum image as an image to be appreciatively watched without adjustment from the image photographed by DSC due to the miss-adjustment of exposure when photographing. In case when appreciatively watching the image, the human face attracts the greatest deal of attention. Thus, in order to form a high quality image, it is important to adjust the luminous intensity of the face at the most optimum luminous intensity. In order to attain this, various methods have been proposed based the detection result of the face by detecting the human face of a person in the image (for example, Patent Reference No. 1).

Patent Reference No. 1: Unexamined Japanese Patent Application No. H08-63597

DISCLOSURE OF THE INVENTION

Problems to be Solved by the Present Invention

However, according to the configuration for correcting the image based on a face detection result by detecting the face in the image, in case when, for example, the face has not been photographed in the image or the face has not been detected as a face even though the face has been photographed, the correction cannot be executed even correction is necessary. Further, in case when mistakenly detected an area, which is not human face, as the human face, there has been a possibility that the image quality inversely deteriorates.

It is therefore an object of the present invention is to execute a proper gradation correction against an image data regardless the existence of the human face in the image in order to solve the problems of the prior art as described above.

Means to Solve the Problems

In order to solve the problems described above, the invention described in claim 1 is an image processing method. The image processing method includes the steps of:

obtaining image data formed by signals of a plurality of pixels expressing a color image;

discriminating a photographic scene of an image from the image data;

determining a gradation correction method based on a result of the step of discriminating a photographic scene, determining a first gradation correction amount based on a result of the step of discriminating a photographic scene;

detecting a face by detecting a face area in an image of the image data and calculating a face detection reliability;

determining a second gradation correction amount based on an average luminance of the face area detected in the step of detecting a face;

determining a third gradation correction amount by weighted averaging the first gradation correction amount and the second gradation correction amount based on the face detection reliability; and applying a gradation correction process to the image data by using the third gradation correction amount and the gradation method.

The invention described in claim 2 is the image processing method of the claim 1, wherein the step of discriminating a photographic scene includes the steps of:

calculating a first occupancy rate by dividing the image data into areas specified by combinations of predetermined brightness and hue, and calculating the first occupancy rate expressing a rate of the divided area against entire image data for the each divided area;

calculating a first and a second indexes by multiplying predetermined first and second coefficients, which are different each other and set in advance, to the first occupancy rate;

calculating second occupancy rates by dividing the image data into predetermined areas specified by combinations of predetermined distances from an external edge of a screen and brightness of the image data, and calculating second occupancy rates expressing the occupancy ratios of the predetermined areas against the entire image data for respective divided areas;

calculating a third index by multiplying a predetermined third coefficient to the second occupancy rate;

calculating a fourth index by multiplying a predetermined fourth coefficient at least to an average luminance of skin color in a center portion of a screen of the image data; and discriminating a photographic scene of the image data based on the first, second, third and forth indexes, which have been calculated.

The invention described in claim 3 is an image processing method. The image processing method includes the steps of:

obtaining a first image data formed by signal of a plurality of pixels expressing a color image, forming a second image data by reducing an image size of the first image data, discriminating a photographic scene of an image from the second image data, determining a gradation correction method based on a result of the step of discriminating a photographic scene, determining a first gradation correction amount based on a obtaining a first image data formed by signals of a plurality of pixels expressing a color image;

forming a second image data by reducing an image size of the first image data;

discriminating a photographic scene of an image from the second image data;

determining a gradation correction method based on a result of the step of discriminating a photographic scene;

determining a first gradation correction amount based on a result of the step of discriminating a photographic scene;

detecting a face by detecting a face area in an image of the second image data and calculating a face detection reliability;

determining a second gradation correction amount based on an average luminance of the face area detected in the step of detecting a face;

determining a third gradation correction amount by weighted averaging the first gradation correction amount and the second gradation correction amount based on the face detection reliability; and applying a gradation correction process to the first image data by using the third gradation correction amount and the gradation method.

The invention described in claim 4 is the image processing method of the claim 3, wherein the step of discriminating a photographic scene includes steps of:

calculating a first occupancy rate by dividing the second image data into areas specified by combinations of predetermined brightness and hue, and calculating the first occupancy rate expressing a rate of the divided area against entire second image data for the each divided area;

calculating a first and a second indexes by multiplying predetermined first and second coefficients, which are different each other and set in advance, to the first occupancy rate;

calculating second occupancy rates by dividing the second image data into predetermined areas specified by combinations of predetermined distances from an external edge of a screen and brightness of the second image data, and calculating second occupancy rates expressing the occupancy ratios of the predetermined areas against the entire second image data for respective divided areas;

calculating a third index by multiplying a predetermined third coefficient to the second occupancy rate;

calculating a fourth index by multiplying a predetermined fourth coefficient at least to an average luminance of skin color in a center portion of a screen of the second image data; and discriminating a photographic scene of the second image data based on the first, second, third and forth indexes, which have been calculated.

The invention described in claim 5 is an image processing apparatus. The image processing apparatus includes:

an obtaining unit for obtaining image data formed by signal of a plurality of pixels expressing a color image;

a scene discrimination unit for discriminating a photographic scene from the image data;

a gradation correction method decision unit for determining a gradation correction method based on a result of discriminating a photographic scene;

a first gradation correction amount decision unit for determining a first gradation correction amount based on a result of discriminating a photographic scene;

a face detection unit for detecting a face area in an image of the image data and calculating a face detection reliability;

a second gradation correction amount decision unit for determining a second gradation correction amount based on an average luminance of the face area detected by the face detection unit;

a third gradation correction amount decision unit for weighted averaging the first gradation correction amount and the second gradation correction amount based on the face detection reliability, and determining a third gradation correction amount; and a gradation correction processing unit for applying a gradation correction process to the image data by using the third gradation correction amount and the gradation method.

The invention described in claim 6 is the image processing apparatus of the claim 5, wherein the scene discrimination unit includes:

a first occupancy rate calculation unit for dividing the image data into areas specified by combinations of predetermined brightness and hue, and calculating the first occupancy rate expressing a rate of the divided area against entire image data for the each divided area;

a first index calculation unit for calculating a first and a second indexes by multiplying predetermined first and second coefficients, which are different each other and set in advance, to the first occupancy rate;

a second occupancy calculation unit for dividing the image data into predetermined areas specified by combinations of predetermined distances from an external edge of a screen and brightness of the image data, and calculating second occupancy rates expressing the occupancy ratios of the predetermined areas against the entire image data for respective divided areas;

a second index calculation unit for calculating a third index by multiplying a predetermined third coefficient to the second occupancy rate;

a third index calculation unit for calculating a fourth index by multiplying a predetermined fourth coefficient at least to an average luminance of skin color in a center portion of a screen of the image data; and a discrimination unit for discriminating a photographic scene of the image data based on the first, second, third and forth indexes, which have been calculated.

The invention described in claim 7 is an image processing apparatus. The image processing apparatus includes:

an obtaining unit for obtaining a first image data formed by signals of a plurality of pixels expressing a color image;

an image reduction unit for forming a second image data by reducing an image size of the first image data;

a scene discrimination unit for discriminating a photographic scene of an image from the second image data;

a gradation correction method decision unit for determining a gradation correction method based on a result of discriminating a photographic scene;

a first gradation correction amount decision unit for determining a first gradation correction amount based on a result of discriminating a photographic scene;

a face detection unit for detecting a face area in an image of the second image data and calculating a face detection reliability;

a second gradation correction amount decision unit for determining a second gradation correction amount based on an average luminance of the face area detected by the face detection unit;

a third gradation correction amount decision unit for determining a third gradation correction amount by weighted averaging the first gradation correction amount and the second gradation correction amount based on the face detection reliability; and a gradation correction processing unit for applying a gradation correction process to the first image data by using the third gradation correction amount and the gradation method.

The invention described in claim 8 is the image processing apparatus of the claim 7, wherein the scene discrimination unit includes:

a first occupancy rate calculation unit for dividing the second image data into areas specified by combinations of predetermined brightness and hue, and calculating the first occupancy rate expressing a rate of the divided area against entire second image data for the each divided area;

a first index calculation unit for calculating a first and a second indexes by multiplying predetermined first and second coefficients, which are different each other and set in advance, to the first occupancy rate;

a second occupancy rate calculation unit for dividing the second image data into predetermined areas specified by combinations of predetermined distances from an external edge of a screen and brightness of the second image data, and calculating second occupancy rates expressing the occupancy ratios of the predetermined areas against the entire second image data for respective divided areas;

a second index calculation unit for calculating a third index by multiplying a predetermined third coefficient to the second occupancy rate;

a third index calculation unit for calculating a fourth index by multiplying a predetermined fourth coefficient at least to an average luminance of skin color in a center portion of a screen of the second image data; and a discrimination unit for discriminating a photographic scene of the second image data based on the first, second, third and forth indexes, which have been calculated.

The invention described in claim 9 is an image processing program to allow computer to realize a gradation correction processing function. The image processing program includes the functions of:

obtaining image data formed by signals of a plurality of pixels expressing a color image;

discriminating a photographic scene of an image from the image data;

determining a gradation correction method based on a result of the step of discriminating a photographic scene, determining a first gradation correction amount based on a result of the step of discriminating a photographic scene;

detecting a face by detecting a face area in an image of the image data and calculating a face detection reliability;

determining a second gradation correction amount based on an average luminance of the face area detected in the step of detecting a face;

determining a third gradation correction amount by weighted averaging the first gradation correction amount and the second gradation correction amount based on the face detection reliability; and applying a gradation correction process to the image data by using the third gradation correction amount and the gradation method.

The invention described in claim 10 is the image processing program of the claim 9, wherein the function of discriminating a photographic scene includes the functions of:

calculating a first occupancy rate by dividing the image data into areas specified by combinations of predetermined brightness and hue, and calculating the first occupancy rate expressing a rate of the divided area against entire image data for the each divided area;

calculating a first and a second indexes by multiplying predetermined first and second coefficients, which are different each other and set in advance, to the first occupancy rate;

calculating second occupancy rates by dividing the image data into predetermined areas specified by combinations of predetermined distances from an external edge of a screen and brightness of the image data, and calculating second occupancy rates expressing the occupancy ratios of the predetermined areas against the entire image data for respective divided areas;

calculating a third index by multiplying a predetermined third coefficient to the second occupancy rate;

calculating a fourth index by multiplying a predetermined fourth coefficient at least to an average luminance of skin color in a center portion of a screen of the image data; and discriminating a photographic scene of the image data based on the first, second, third and forth indexes, which have been calculated.

The invention described in claim 11 is an image processing program to allow computer to realize a gradation correction processing function. The image processing program includes the functions of:

obtaining a first image data formed by signals of a plurality of pixels expressing a color image;

forming a second image data by reducing an image size of the first image data;

discriminating a photographic scene of an image from the second image data;

determining a gradation correction method based on a result of the step of discriminating a photographic scene;

determining a first gradation correction amount based on a result of the step of discriminating a photographic scene;

detecting a face by detecting a face area in an image of the second image data and calculating a face detection reliability;

determining a second gradation correction amount based on an average luminance of the face area detected in the step of detecting a face;

determining a third gradation correction amount by weighted averaging the first gradation correction amount and the second gradation correction amount based on the face detection reliability; and applying a gradation correction process to the first image data by using the third gradation correction amount and the gradation method.

The invention described in claim 12 is the image processing program of the claim 11, wherein the function of discriminating a photographic scene includes functions of:

calculating a first occupancy rate by dividing the second image data into areas specified by combinations of predetermined brightness and hue, and calculating the first occupancy rate expressing a rate of the divided area against entire second image data for the each divided area;

calculating a first and a second indexes by multiplying predetermined first and second coefficients, which are different each other and set in advance, to the first occupancy rate;

calculating second occupancy rates by dividing the second image data into predetermined areas specified by combinations of predetermined distances from an external edge of a screen and brightness of the second image data, and calculating second occupancy rates expressing the occupancy ratios of the predetermined areas against the entire second image data for respective divided areas;

calculating a third index by multiplying a predetermined third coefficient to the second occupancy rate;

calculating a fourth index by multiplying a predetermined fourth coefficient at least to an average luminance of skin color in a center portion of a screen of the second image data; and discriminating a photographic scene of the second image data based on the first, second, third and forth indexes, which have been calculated.

Effects of the Invention

According to the invention described in claims 1, 5 and 9, the first gradation correction amount based on the scene discrimination result, the second gradation amount based on the average luminance of a face area and the weight are changed based on the face detection reliability, irrespective to the existence of a face in the image, a proper gradation correction can be executed.

According to the invention described in claims 2, 6 and 10, since the first, second and third indexes quantitatively expressing a photographic scene of image data is calculated, and the photographic scene of the image data is discriminated based on these indexes, the photographic scene of the image data can be accurately specified.

According to the invention described in claims 3, 7 and 11, since the weight of first gradation correction amount based on the scene discrimination result and the second gradation correction amount based on the average luminance of a face area is changed, irrespective to the existence of a face in the image, a proper gradation correction can be executed. Further, a process time can be shortened by conducting the photographic scene discrimination and a face area detection by utilizing the second image data, into which image size of the first image data has been reduced.

According to the invention described in claims 4, 8 and 12, since the first, second, third and fourth indexes quantitatively expressing the photographic scene of the second image data are calculated and the photographic scene is discriminated based on these indexes, the photographic scene of the second image data can be accurately specified.

| EXPLANATION OF TERMS | |
|---|---|
| 1 | Image processing apparatus |
| 4 | Exposure processing unit |
| 5 | Print forming unit |
| 7 | Image processing unit |
| 8 | CRT |
| 9 | Film scanner unit |
| 10 | Reflection original input unit |
| 11 | Operation unit |
| 14 | Image reading unit |
| 15 | Image writing unit |
| 30 | Image transfer section |
| 31 | Image transporting unit |
| 32 | Communication section (input) |
| 33 | Communication section (output) |
| 34 | External printer |
| 70 | Image processing unit |
| 701 | Film scan data processing unit |
| 702 | Reflection original scan data processing unit |
| 703 | Image data format decoding processing unit |
| 704 | Image adjustment processing unit |
| 705 | CRT inherent processing unit |
| 706 | Printer inherent processing unit (1) |
| 707 | Printer inherent processing unit (2) |
| 708 | Image data form creation processing unit |
| 709 | Image reduction unit |
| 710 | Scene discrimination unit |
| 712 | Ratio calculation unit |
| 713 | Index calculation unit |
| 714 | Scene discrimination execution unit |
| 715 | Color system conversion unit |
| 716 | Histogram creation unit |
| 717 | Occupancy calculating unit |
| 718 | First occupancy calculation unit |
| 719 | Second occupancy calculation unit |
| 720 | First index calculation unit |
| 721 | Second index calculation unit |
| 722 | Third index calculation unit |
| 730 | Gradation correction method decision unit |
| 731 | Gradation correction parameter calculation unit |

-continued

| EXPLANATION OF TERMS | |
|---|---|
| 732 | First gradation correction amount decision unit |
| 733 | Face detection unit |
| 734 | Face detection reliability calculation unit |
| 735 | Second gradation correction amount decision unit |
| 736 | Third gradation correction amount decision unit |
| 737 | Image processing execution unit2 |
| 71 | data storage section. |

DESCRIPTION OF THE PROFFERED EMBODIMENT

An embodiment of the present invention will be described in detail by referring to FIGS. 1-24 hereinafter. However, the present invention is not limited to those examples in FIGS. 1-24.

<Outline Configuration of Image Processing Apparatus 1>

Firstly, the first image processing apparatus of the embodiment 1 of the present invention will be described.

Figure 1:
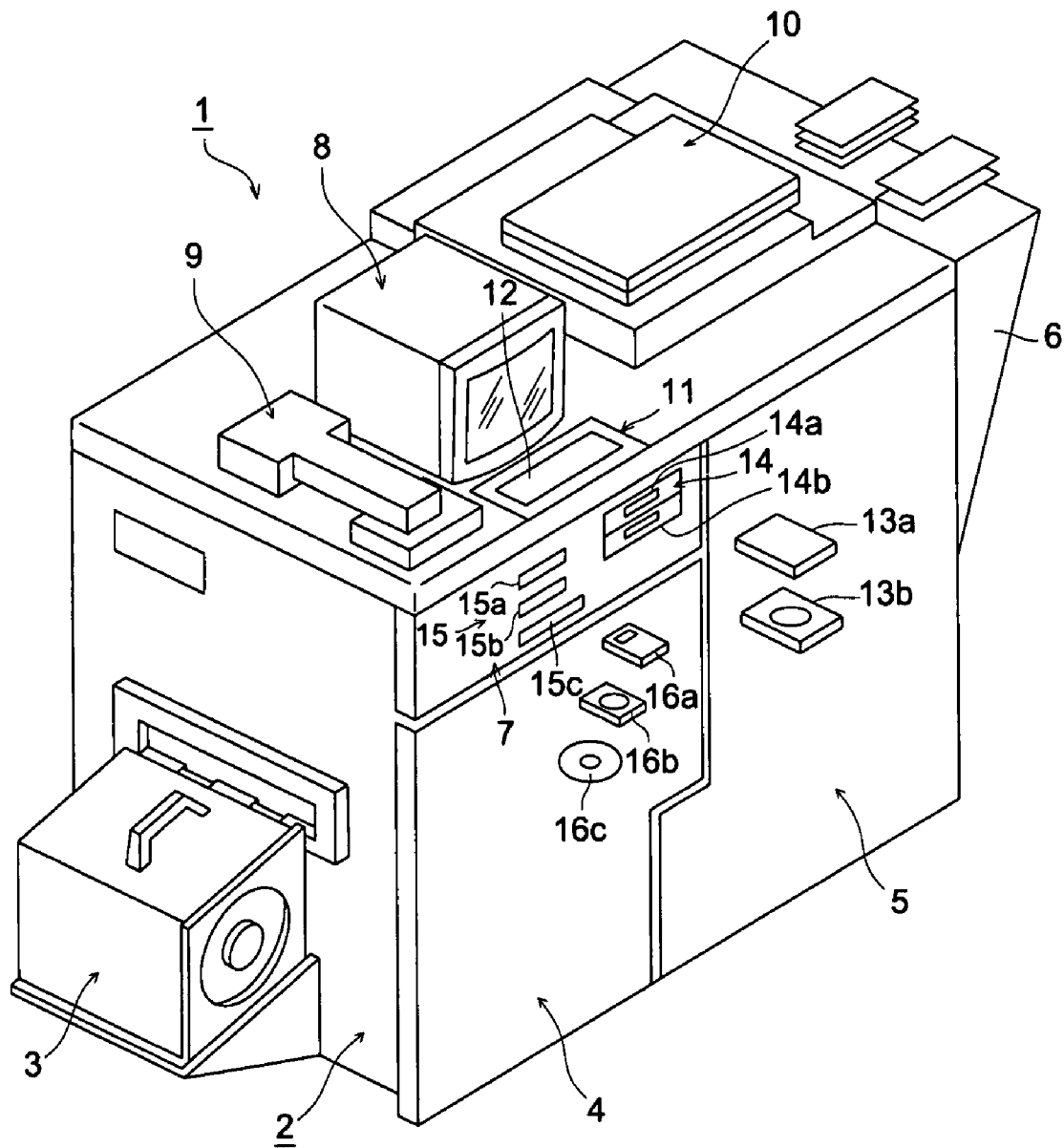
FIG. 1 illustrates a perspective view showing an outline configuration of an image processing apparatus 1 of the present invention.

FIG. 1 illustrates a perspective view showing an outline configuration of an image processing apparatus 1 of the present invention.

As illustrated in FIG. 1, a magazine loading unit 3 for loading photosensitive material is provided on one side of a main body 2 in the image forming apparatus 1. An exposure processing unit 4 for exposing the photosensitive material and a print forming unit 5 for forming a print are provided inside the main body 2. A formed print is ejected onto a try 6 provided on the other side surface of the main body 2.

A CTR (Cathode Ray Tube) 8 as a display unit, a film scanner unit 9 for reading a transparent original, a reflection original input unit 10 and an operation unit 11 are provided on the upper portion of the main body 2. Further, an image reading unit 14 for reading image data recorded onto various digital recording media and an image writing unit 15 for writing (outputting) image data to the various digital recording media in the main body 2. An image processing unit 7 for totally controlling respective units is provided in the main body 2.

The image reading unit 14 includes an adaptor for a personal computer card 14a and an adaptor for a floppy (Trademark) disk 14b, which allow a personal computer card 13a and a floppy (Trademark) disc 13 to be inserted. The PC card 13a includes a memory, into which a plurality of image data photographed by a digital camera is recorded. A plurality of image data photographed by, for example, a digital camera is recorded to the floppy (Trademark) disk 13b. Other than these, with respect to the recording media including image data, there are a multimedia card, a memory stick, CD-ROM (Compact Disc Read Only Memory).

The image writing unit 15 includes a floppy (Trademark) disk adaptor 15a and a MO adaptor 15b, an optical disc adaptor 15c, into which, a floppy (Trademark) disk 16a, a MO 16b and an optical disc 16c can be inserted to write image data onto the image recording media. With respect to the optical discs, there are a CD-R (Compact Disc-Recorder) and DVD-R (Digital Versatile Disk-Recordable).

Meanwhile, in FIG. 1, the structure of the main body 2 is designed to integrally include the operation unit 11, the CRT 8, the film scanner 9, the reflection original input unit 10 and the image reading unit 14. However, any one or more of them may be separately provided as a standalone body.

Meanwhile, in the image processing apparatus 1 in FIG. 1, an example, in which exposition, development and print of an image onto the photographic material are conducted, is shown. However, the method for forming the print is not limited to this. For example, an inkjet system, an electronic photographing system, a thermal system and a sublimate system may be used.

<Internal Configuration of Image Processing Apparatus 1>

Figure 2:
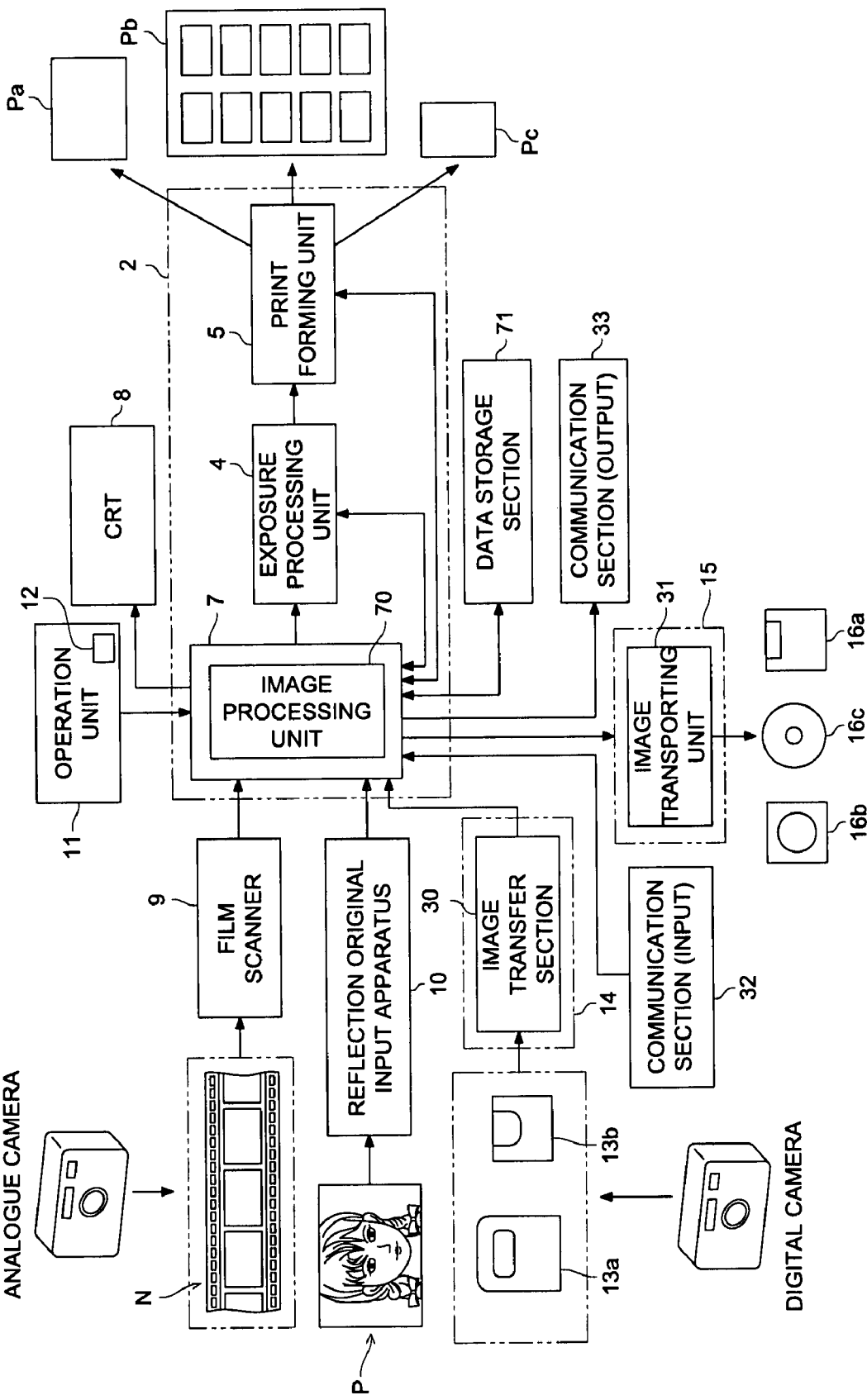
FIG. 2 illustrates a block diagram showing an internal configuration of the image processing apparatus 1.

FIG. 2 illustrates a block diagram showing an internal configuration of the image processing apparatus 1. The image forming apparatus 1 is configured, as illustrated in FIG. 2, by an image processing unit 7, an exposure processing unit 4, a print forming unit 5, a CRT 8, a film scanner unit 9, a reflection original input unit 10, an operation unit 11, an image reading unit 14, an image writing unit 15, a communication unit (input) 32, a communication unit (output) 33 and a data storage unit 71.

The image processing unit 7 totally controls respective units configuring the image processing apparatus 1 by the co-work with various control programs, such as various image processing programs memorized in a memory unit (not shown), such as a ROM (Read Only Memory) and a CPU (Central Processing Unit) (not shown).

The image processing unit 7 includes an image processing unit 70. The image processing unit 7 applies the image process against the image data acquired from the film scanner unit 9 and the reflection original input unit 10 based on the input signal (instruction information) from the operation unit 11, and the image data inputted from external equipment via the communication unit (input) 32 to form output image data, and outputs them to the exposure processing unit 4. The image processing unit 70 executes a conversion process against the image data, onto which the image process has been applied, corresponding to the output type to output them out. With respect to the target of the output, there are the CRT 8, the image writing unit 15 and the communication unit (output) 33.

The exposure processing unit 4 exposes an image onto a photosensitive material and output the photosensitive material to the print forming unit 5. The print forming unit 5 applies a developing process against the exposed photosensitive material and dray them to forms Pa, Pb and Pc. The print Pa denotes prints of a service size, a hi-vision size and a panoramic size. The print Pb denotes a print having an A4 size and the Print Pc denotes a print of a business card size.

The film scanner unit 9 is to read a developed negative film photographed by an analog camera and the image recorded on a transparent original, such as a reversible film.

The reflective original input unit 10 is to read the image formed on a print (a photographic print, a picture and various printing materials) by a flat head scanner (not shown).

The operation unit 11 includes an information input unit 12. The information input unit 12 is configured by, for example, a touch panel and arranged to output the pushed down signal of the information input unit 12 as the input signal to the image processing unit 7. Meanwhile, the operation 11 may be configured by including a keyboard and a mouse. The CRT 8 is to display the image data according to the display signal inputted from the image processing unit 7.

The image reading unit 14 includes an image transfer section 30, the adaptor card for a personal computer 14a and the adaptor for a floppy (Trademark) disk 14b. The image reading unit 14 is to read image data recorded on the PC card 13a inserted to the adaptor card for a personal computer 14a and a floppy (Trademark) disk 13b inserted to the adaptor for a floppy (Trademark) disk 14b and transmit them to the image processing unit 7. With respect to the adaptor for a personal computer 14a, for example, a personal computer card reader and personal computer card slot are utilized.

The image writing unit 15 includes the floppy (Trademark) disk adaptor 15a, a MO adaptor 15b and an optical disc adaptor 15c as an image transporting unit 31. The image writing unit 15 is to write generated image data to a floppy (Trademark) disk 16a inserted to the floppy (Trademark) disk adaptor 15a, a MO 16b inserted to the MO adaptor 15b and to the optical disc 16c inserted to the optical disc adaptor 15c according to writing signal inputted from the image processing unit 7.

The communication unit (input) 32 is to receive image data expressing a photographed image and a print instruction signal from a different computer provided within a facility where the image processing apparatus 1 is set and a remote personal computer via internet.

The communication unit (output) 33 is to transmit the image data of a photographed image, onto which a image process has been applied, and order information (information including the number of prints, the shot of the image and print size, etc) to the different computer provided within the facility where the image processing apparatus 1 is set and the remote personal computer via internet.

A data storage unit 71 is to memorize image data and corresponding order information and sequentially store them.
<Configuration of Image Processing Unit 70>

Figure 3:
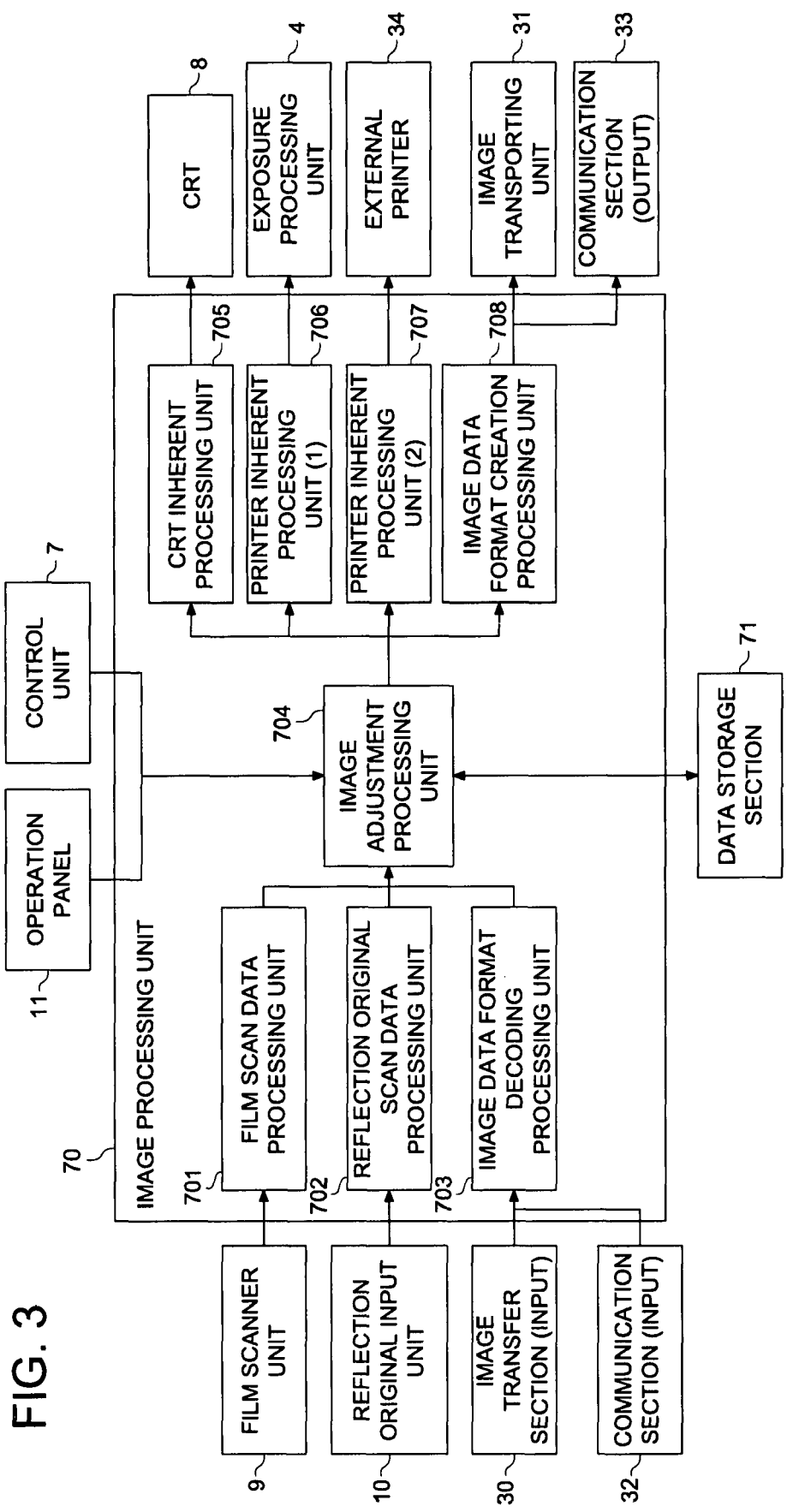
FIG. 3 illustrates a block diagram showing a functional configuration of an image processing unit 70 of the image processing apparatus 1.

FIG. 3 illustrates a block diagram showing a functional configuration of an image processing unit 70 of the image processing apparatus 1. As illustrated in FIG. 1, the image processing unit 70 is configured by a film scan data processing unit 701, a reflection original scan data processing unit 702, an image data decoding unit 702, an image adjustment processing unit 704, a CRT inherent unit 705, a print inherent processing unit (1) 707, a print inherent processing unit (2) 707 and an image data form creation processing unit 708.

The film scan data processing unit 701 applies an inherent proof operation of the film scan unit 9 and the reversal of a negative/positive in case of a negative original, removal of dirt and scratches, a gray-balance adjustment, a contrast adjustment, particle noise removal and emphasis of acutance to the image data inputted from the film scanner unit 9 and outputs them to the image adjustment processing unit 704. Further, the film scan data processing 701 also outputs information of a film size, a negative/positive type, ISO (International Organization for Standardization) sensitivity, name of manufacturer, information related to the main object and information related to the photographic condition (written information contents, for example, APS (Advanced Photo System)) to the image adjustment processing unit 704.

Reflection original scan data processing unit 702 applies an inherent proof operation of the film scan unit 10, the reversal of a negative/positive in case of a negative original, removal of dirt and scratches, a gray-balance adjustment, a contrast adjustment, particle noise removal and emphasis of acutance to the image data inputted from the film scanner unit 10 and outputs them to the image adjustment processing unit 704.

The image data format decoding processing unit 703 executes decoding of reduced code and conversion of the expression method of chromatic data when necessary according to the data form of the image data inputted from the image transfer section 30 and the communication unit (input) 32, converts the data form, which fits to the calculation executed inside the image processing unit 70 and outputs them to the image adjustment processing unit 704.

The image adjustment processing unit 704 executes various image processes against the image received from the film scanner unit 9, the reflection original unit 10, the image transporting unit 30 and the communication unit (input) 32 according to the instruction of the operation unit 11 or the image processing unit 7. Then the image adjustment processing unit 704 outputs the processed image signal to the CRT inherent processing unit 705, the print inherent processing unit (1) 706, the print inherent processing unit (2) 707 and the image data form creation processing unit 708.

The CRT inherent processing unit 705 executes the processes of change of the number of pixels and chromatic matching against the image data inputted from the image adjustment processing unit 704 according to the necessity and outputs the image data to be displayed, which have been synthesized with control information, such as, the information necessary to be displayed, to the CRT 8.

The printer inherent processing unit (1) 706 executes the printer inherent correction process, chromatic matching and image pixel number change against the image data inputted from the image adjustment processing unit 704, and outputs them to the exposure processing unit 4 when necessary.

In case when the external printers 34, such as, a wide-form inkjet printer is connect to the image processing apparatus 1, the printer inherent processing unit (2) 707 is separately provided for connected respective printers. The printer inherent processing unit (2) 707 executes the printer inherent correction process, chromatic matching and image pixel number change against the image data inputted from the image adjustment processing unit 704.

The image data form creation processing unit 708 executes JPEG (Joint Photographic Experts Group), TIFF (Tagged Image File Format), Exif (Exchangeable Image File Format), which represent various kinds of general image formats when necessary and outputs them to the communication unit (output) 33.

The classification of the film scan data processing unit 701, the reflection original scan data processing unit 702, the image data form reading processing unit 703, the image adjustment processing unit 704, the CRT inherent processing unit 705, the printer inherent processing unit (1) 706, the printer inherent processing unit (2) 707 and image data from creation processing unit 708 is a classification, which is provided for the image processing unit 70 to help understand of the functions, but they are not necessary to be realized as an independent device. For example, they may be realized as the classification of the types of software processing of a single CPU. Further, the image processing apparatus 1 of the present invention is not limited to the contents of described above and will be applied to various embodiments, such as, a digital photo printer, a printer driver and a plug-in of various image processing software.

Figure 4:
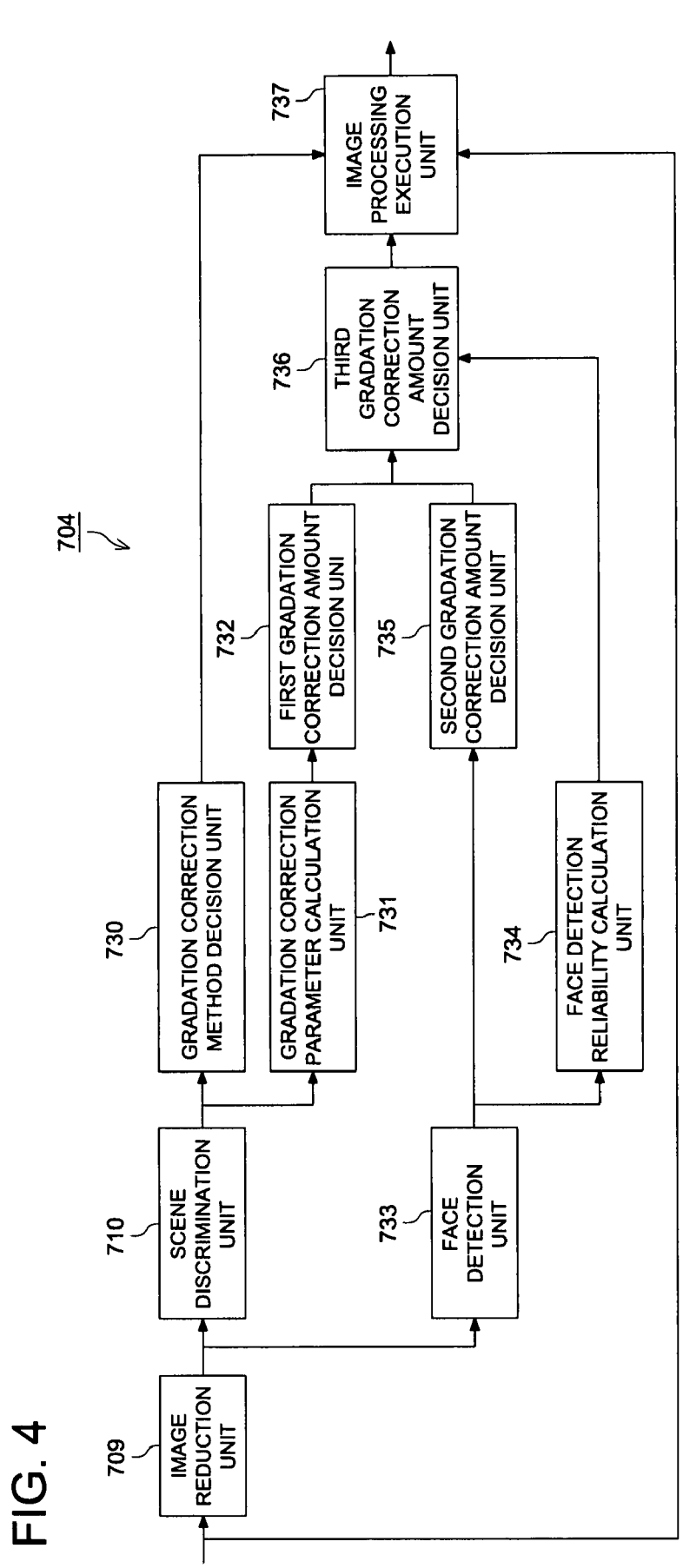
FIG. 4 illustrates a block diagram showing an internal configuration of an image adjustment processing unit 704.

FIG. 4 illustrates an internal configuration of an image adjustment processing unit 704. As illustrated in FIG. 4, the image adjustment processing unit 704 is configured by the image reduction unit 709, a scene discrimination unit 710, a gradation correction method decision unit 730, a gradation correction parameter calculation unit 731, a first ratio calculation unit 732, a first gradation correction amount decision unit 732, a face detection unit 733, a face detection reliability calculation unit 734, the second gradation correction amount decision unit 735, a third gradation correction amount decision unit 736 and an image processing execution section 737.

The image reduction unit 709 reduces the image size from the original image data as the first image data and form reduced image data as the second image data. With regard to the method for reducing the image size, it is possible to use a publicly known method, such as a bilinear method and a bicubic method. The reduction ratio is not particularly limited a certain value. However, the reduction ratio is preferably ½-⅒ from the viewpoint of a processing velocity and the accuracy of the scene discrimination processing and the face detection processing.

The scene discrimination unit 710 discriminates a photographic scene from the reduced image data.

Figure 5:
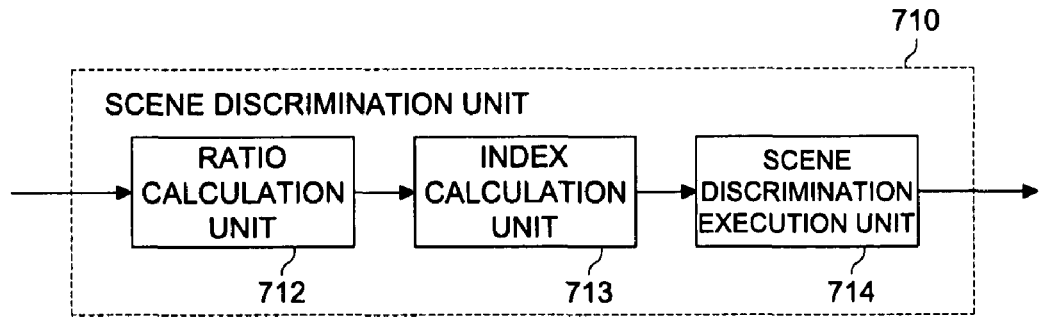
FIG. 5 (a) illustrates a block diagram showing an internal configuration of a scene discrimination unit 710, (b) illustrates a block diagram showing an internal configuration of a ratio calculation unit 712, (c) illustrates a block diagram showing an internal configuration of an occupancy calculation unit 717 and (d) illustrates a block diagram showing an internal configuration of an index calculation unit 713.
Figure 5:
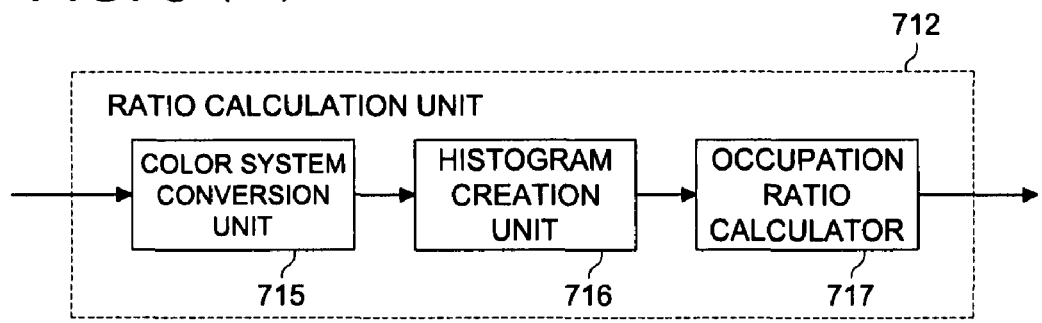
Figure 5:
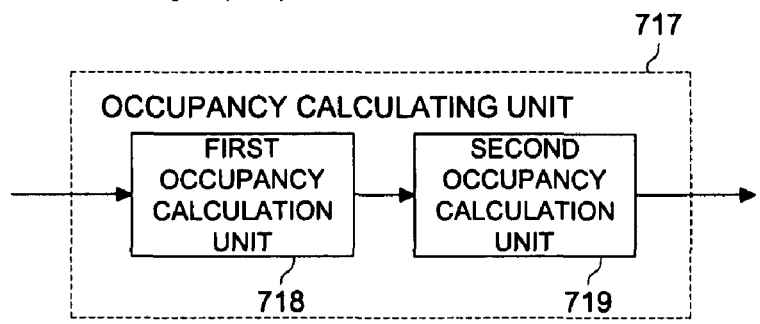
Figure 5:
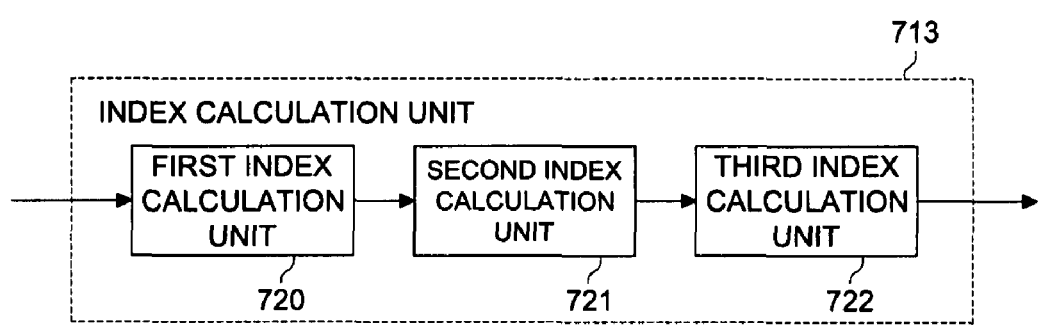

FIG. 5 (a) illustrates a block diagram showing an internal configuration of a scene discrimination unit 710. As shown in FIG. 5(a), the scene discrimination unit 710 is configured by a ratio calculation unit 712, an index calculation unit 713 and scene discrimination execution unit 714. FIG. 5(b) illustrates a block diagram showing an internal configuration of a ratio calculation unit 712. The ratio calculation unit 712 is configured by a color system conversion unit 715, a histogram creation unit 716 and an occupancy calculation unit 717.

A color system conversion unit 715 converts the values of RGG (Red, Green and Blue) of image data to a HSV color system. The HSV color system is to express the image data by three elements of Hue, Saturation and Brightness, which is designed based on a color system proposed by Munsell.

In this embodiment, "brightness" means "brightness", which is generally used unless otherwise comments are provided. In the description below, V (0-255) of HSV color system is used as "brightness". However, any color unit system showing "brightness" may be used. At that time, it is apparent that the values of various coefficients written in this embodiment are needed to be re-calculated. Further, the image data in this embodiment is image data, in which a person is a main object.

A histogram creation unit 716 divides the image data into predetermined areas formed from the combination of Hue and Brightness, and creates a two-dimensional histogram by calculating the accumulated image pixels for respective divided areas. Further, the histogram creation unit 716 divides the image data into predetermined areas formed from the combination of the distance from the external edge of the screen of the image and Brightness, and creates a two-dimensional histogram by calculating the accumulated image pixels for respective divided areas. Meanwhile, a three dimensional histogram may be formed by divining the image data into predetermined areas formed from the combination of the distance from the external edge of the screen of the image, Brightness and Hue, and by calculating the accumulated image pixels for respective divided areas. The method for creating the two dimensional histogram will be explained hereinafter.

FIG. 5(c) illustrates an internal configuration of an occupancy calculation unit 717. As illustrated in FIG. 5(c), the occupancy calculation unit 717 is configured by a first occupancy calculation unit 718 and a second occupancy calculation unit 719. The first occupancy calculation unit 718 calculates the first occupancy rate (refer to the table 1, which will be described later) showing the occupying ratio of the accumulated image pixels calculated in the histogram creation unit 716 against the total image pixels (entire image data) separately for respective areas, which have been divided based on the combination of Brightness and Hue. The second occupancy calculation unit 719 calculates the second occupancy rate (refer to the table 2, which will be described later) showing the occupying ratio of the accumulated image pixels calculated in the histogram creation unit 716 against the total image pixels (entire image data) for respective areas, which have been divided based on the combination of the distance from the external edge of the screen of the image and Brightness.

FIG. 5(d) illustrates an internal configuration of an index calculation unit 713. As shown in FIG. 5(d), the index calculation unit 713 is configure by the first ratio calculation unit 720, the second ratio calculation unit 721 and the third ratio calculation unit 722.

The first ratio calculation unit 720 calculates the first index a1 for specifying a photographic scene by multiplying the first coefficient (refer to the table three described later) set in advance based on a photographic condition (for example, based on a discrimination analysis) to the first occupancy rate calculated in the first occupancy rate calculation unit 718 for respective areas and taking addition of them. Here, the photographic scene denotes an exposure condition, such as, front lighting, back lighting, a light source condition of a strobe when photographing and under-exposure. The first index a1 is an index for expressing the feature when photographing, such as indoor photographing, close-up photographing, facial tone high-brightness, which separates the image, which will be determined to be "STROBE", from the other photographic scenes.

In case when calculating the first index a1, the first index calculation unit 720 use a different coefficients having different signs between the skin color hue area having a predetermined high brightness and the hue area having other than the skin color hue area having a predetermined high brightness. Here, brightness values 170-224 in the HSV color system will be included in the predetermined high brightness skin color hue area. Further, the hue area other than the skin color hue area having a predetermined high brightness includes at least a blue color hue area (hue values 161-250) or a green color hue area (hue values 40-160).

Further, the first index calculation unit 720 calculates the second index a2 for specifying a photographic scene by multiplying the second coefficient (refer to table 4 described later) set in advance according to the photographic conditions (for example, based on a discrimination analysis) to the first occupancy rate calculated in the first occupancy rate calculation unit 718 separately for respective areas and taking addition of them. The second index a2 expresses features when back-light-photographing, such as outdoor-photographing, blue-sky high brightness and skin color low brightness. The second index a2 is used for separating the image, which will be determined to be "BACK LIGHTING", from the other photographic scenes.

In case when calculating the second index a2, the first index calculation unit 720 use a different coefficient having different signs between the middle brightness area of the skin color hue area (hue values 0-39, 330-359) and other than the middle brightness area of the skin color hue area. Here, brightness values 85-169 will be included in the middle brightness area of the skin color hue area. Further, the brightness area other than the middle brightness area includes, for example, shadow area (brightness values 26-84).

The second index calculation unit 721 calculates the third index a3 for specifying a photographic scene by multiplying the third coefficient (refer to table 5 described later) set in advance according to the photographic conditions (for example, based on a discrimination analysis) to the second occupancy rate calculated in the second occupancy rate calculation unit 719 separately for respective areas and taking addition of them. The third index a3 is to express the differences in brightness and darkness between the center area and the circumference area of the screen of the image data and quantitatively specify only the image determined to be "BACK LIGHTING" and or "STROBE". When calculating the third index a3, the index calculation unit 713 uses the different value corresponding to the distance from the external edge of the screen of the image data.

The third index calculation unit 722 calculates the fourth index a4 for specifying a photographic scene by multiplying the fourth coefficient set in advance according to the photographic conditions (for example, based on a discrimination analysis) to the average luminance of skin color in the center of the screen of the image and taking addition of them. More preferably, the third index calculation unit 722 calculates the fourth index a4 for specifying a photographic scene by multiplying the fourth coefficient not only to the average luminance of skin color in the center of the screen of the image, but also to the differential value (refer to a formula (9) described later) between the maximum luminance value and the average luminance value, a luminance standard deviation, an average luminance value in the center of the screen and a comparison value between the differential value calculated by the skin color maximum luminance value and the skin color minimum luminance value, and skin color average luminance color, and taking addition of them. It is apparent that the fourth coefficient may be changed corresponding to a variable to be used. The fourth index a4 is to express not only the difference between the brightness and darkness in the center area and the circumference area of the screen of the image data but also the distribution information in the luminance histogram, and to quantitatively express only the image determined to be a strobe photographing scene or under-exposure photographing scene.

In case when calculating the fourth index a4, the third index calculation unit 722 uses the average luminance value of the skin color in the center of the screen, the differential value between the maximum luminance value and the average luminance value, the luminance standard deviation, an average luminance value in the center of the screen and the comparison value between the differential value between the skin color maximum luminance value and the skin color minimum luminance value, and skin color average luminance color. Here, the term "luminance value" denotes an index for expressing lightness and, for example, the other index for expressing the lightness, for example, brightness value in the HSV color system may be used. Further, with respect to the maximum luminance value, the skin color maximum luminance value and the skin color minimum luminance value, the luminance value of the pixel whose accumulated number of pixels from the maximum or minimum luminance value has reached to a predetermined ratio against the total image pixels, may be used.

The third index calculation unit 722 calculates the fifth index a5 by separately multiplying the coefficient set in advance according to the photographic conditions (for example, based on a discrimination analysis) to the first index a1 and the third index a3 and taking addition of them. More preferably, the third index calculation unit 722 calculates the fifth index a5 by respectively multiplying the coefficient set in advance according to the photographic conditions (for example, based on a discrimination analysis) to the first index a1, the third index 3a and the fourth-dash (4') index a4' (an average luminance of skin color in the center portion of the screen), and taking addition of them. Further, the third index calculation unit 722 calculates the six index a6 by multiplying the coefficient set in advance according to the photographic conditions (for example, based on a discrimination analysis) to the second index a2 and the third index a3 and taking addition of them. More preferably, the third index calculation unit 722 calculates the sixth index a6 by respectively multiplying the coefficient set in advance according to the photographic conditions (for example, based on a discrimination analysis) to the second index a2, the third index 3a and the fourth-dash (4') index a4', and taking addition of these.

The scene discrimination unit 714 discriminates a photographic scene of image data (a light source condition and an exposure condition) based on the fourth index a4, the fifth index a5 and the sixth index a6, which are calculated in the index calculation unit 713.

Meanwhile, more specifically, the calculation method of the first index a1-sixth index a6 in the index calculation unit 713 and the discrimination method of the photographic scene in the scene determination unit 714 will be described in detail later in the description of the operation of the embodiments of the present invention.

In FIG. 4, the gradation correction method decision unit 30 determines the gradation correction method based on the photographic scene discriminated by the scent discrimination unit 710. For example, in case when the scene is front lighting, as illustrated in FIG. 18(a), the translation correction method (offset) of the pixel value of the inputted image data (gradation correction A) will be applied. In case when the scene is back lighting, as illustrated in FIG. 18(b), the method of gamma correction of the pixel value of the inputted image data (gradation correction method B) will be applied. In case when the photographic scene is a strobe, as illustrated in FIG. 18(c), the method of gamma correction and translation correction method (offset) of the pixel value of inputted image data (gradation correction method C) will be applied. In case when the scene is under lighting, as illustrated in FIG. 18(b), the method of gamma correction of the pixel value of inputted image data (gradation correction method B) will be applied.

The gradation correction parameter calculation unit 731 calculates parameters (key correction values) necessary for a gradation correction based on the fourth index a4, the fifth index a5 and the sixth index 6a, which have been calculated by the scene discrimination unit 710.

The first gradation correction amount decision unit 732 determines the gradation correction amount of the gradation correction method determined by the gradation correction method decision unit 730 based on the parameters calculated in the gradation correction parameter calculation unit 731.

A face detection unit 733 detects a face area in the image from the reduced image data. Concretely, the face detection unit 733 forms a low frequency image from the reduced image data, specifies the pixels showing skin color from the low frequency image and extracts face candidate areas by the simple area expansion method from the image pixels. Then, the face detection unit 733 deems the characteristic value of the face candidate areas as input parameters, determines whether the face candidate areas are a face by neural network and detects the face areas. The face detection process will be described in detail in the operation explanation later.

The face detection reliability calculation unit 374 calculates the face detection reliability for showing the reliability of the face area detected by the face detection unit 733. In case when the neural network is used for the face detection process, in general, the determination result of whether the object is a face is outputted as a continuous value from zero (0) to one (1). However, the face detection reliability can be obtained by setting that the output value of not more than 0.9 is determined to be "definitely the object is not a face" and the output value of 0.9-1 is determined to be phased in from "the face detection reliability is low" to "the face detection reliability is high". Further, even when whether the object is a face or not is determined by using a pattern matching method, the face detection reliability can be obtained the same as above.

In this embodiment of the present invention, the face detection unit 733 written in the claims of the present invention will be realized by the face detection unit 733 and the face detection reliability calculation unit 734.

The second gradation correction amount decision unit 735 determines the second gradation correction amount based on the average luminance of the face area detected by the face detection unit 733. The second gradation correction amount can be obtained by calculating, for example, the average luminance of the face area and obtaining based on the differential value between the calculated average luminance value and the target luminance value determined in advance. Further, the target luminance value may be changed by each scene category obtained by the scene discrimination process. In case when a plurality of face areas has been detected, the second gradation correction amount is preferably obtained from the most reliable face area.

The third gradation correction decision unit 736 determines the third gradation correction amount by averaging the first gradation correction amount and the second gradation correction amount with weight based on the face detection reliability calculated by the face detection reliability calculation unit 734. At this moment, in case when the face detection reliability is high, the weight of the second gradation correction amount should be raised and in case when the face detection reliability is low, the weight of the first gradation correction amount should be raised to conduct averaging. In case when a face is not found, only the first gradation correction amount is used as the third gradation correction amount.

The image processing execution unit 737 executes a gradation correction process of original image data and the other image processes based on the gradation correction method determined by the gradation correction method decision unit 730 and the third gradation correction amount determined by the third gradation correction decision unit 736.

Next, the operation of the embodiment of the present invention will be described. The image process of the photographed image data in the embodiment of the invention will be executed in the image processing unit 70 by the co-work between the programs, which has been read out from a memory unit (not shown) and expanded on the RAM (not shown), and the CPU (not shown) based on the trigger of an image process execution input from the operation unit 11.

Figure 6:
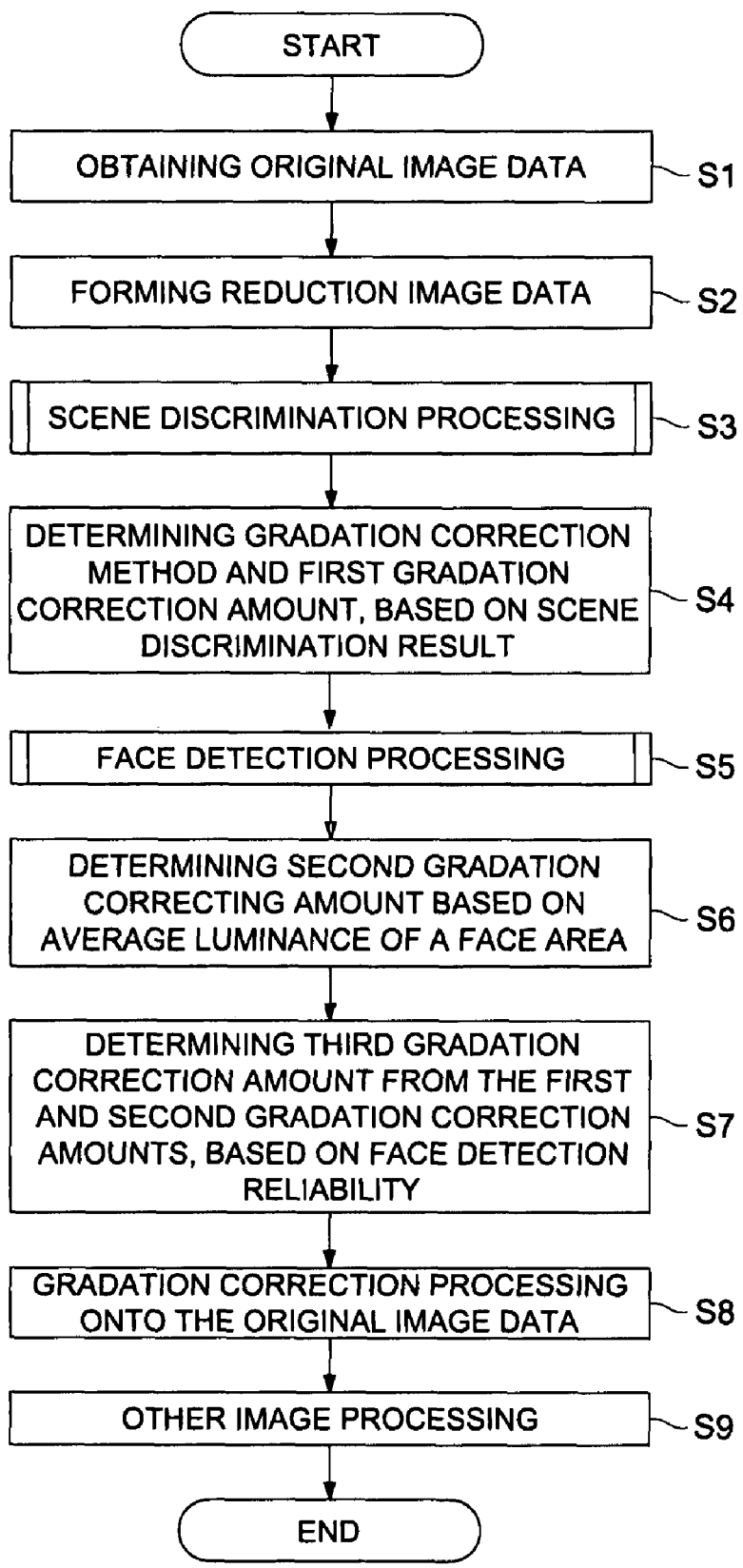
FIG. 6 illustrates a flowchart showing the image process executed in the image processing unit 704.

FIG. 6 illustrates the flowchart of the image processing. As shown in FIG. 6, firstly, the original image data is obtained from a film scanner unit 9, a reflection original input unit 10, an image transfer section 30 and a communication section (input) 32 in the image adjustment processing unit 704 via a film scan data processing unit 701, a reflection original scan data processing unit 702 and an image data format decoding processing unit 703 (STEP S1). The image process (a gradation correction process) of the embodiment of the invention is preferably applied to the image data photographed by a DSC.

Next, the image reduction unit 709 reduces the original image data to form reduced image data (STEP 2).

Then, a scene discrimination unit 710 executes a scene discrimination process for decimating a photographed scene from reduced image data (STEP S3).

Figure 7:
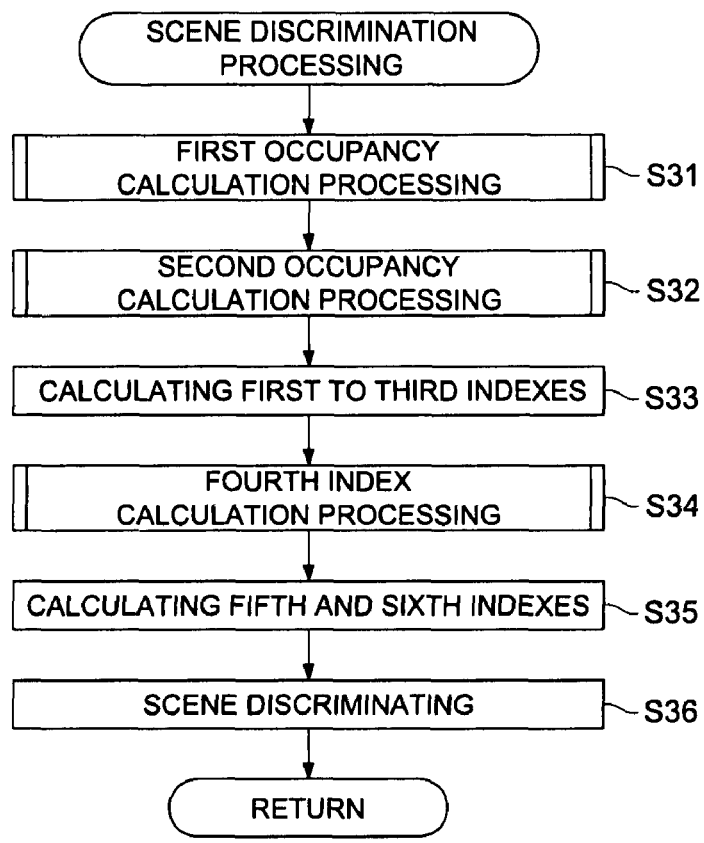
FIG. 7 illustrates a flowchart showing a scene discrimination process under an image process.

FIG. 7 illustrates a flowchart showing a scene discrimination process under an image process. As shown in FIG. 7, in the scene discrimination process of the STEP 3, the first occupancy rate calculation unit 718 divides the image data into predetermined areas and executes the first occupancy rate calculation process for obtaining the occupancy rates expressing the rate of the respective divided image areas against the entire image data (STEP 31).

Figure 8:
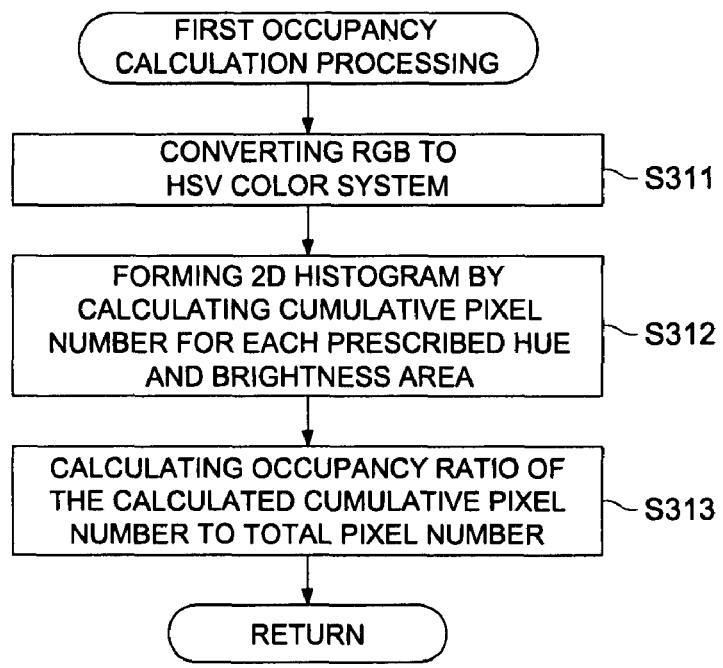
FIG. 8 illustrates a flowchart showing the first occupancy calculation process under a scene discrimination process.

FIG. 8 illustrates a flowchart showing the first occupancy calculation process under a scene discrimination process. As shown in FIG. 8, in the first occupancy rate calculation process in the STEP S31, firstly, the color system conversion unit 715 converts RGB values of the image data into the HSV color system (STEP S311).

Next, the histogram creation unit 716 divides the image data into areas formed by a predetermined brightness and a predetermined hue. Two dimensional histogram is formed by calculating the accumulated image pixels to each divided area (STEP S312). The area divide of the image data will be described in detail hereinafter.

Brightness (v) is divided into seven areas of brightness values 0-25 (v1), 26-50 (v2), 51-84 (v3), 85-169 (v4), 170-199 (v5), 200-224 (v6) and 225-255 (v7). Hue (H) is divided into four areas (H1 and H2) of a skin color hue area of hue values 0-39, 330-359, a green color hue area (H3) of hue values 40-160, a blue color hue area (H4) and a red color hue area (H5) of hue values of hue values 160-250. Here, the red color hue area (H5) is not used in the calculation described below from the viewpoint that the red color hue area (H5) has little participation in the discrimination of the photographic scene. The skin color hue area is further divided into a skin color area (H1) and other area (H2). Hereinafter, among the skin color hue areas (H=0-39, 330-359), the hue' (H1), which satisfies the formula (2) below, is set as a skin color area (H1) and the area, which does not satisfy the formula (2), is set to (H2). Where the values of the input image data are set as InR, InG and InB.

$$10 < \text{Saturation } (S) < 175$$

$$\text{Hue}' (H) = \text{Hue} (H) + 60 \text{ (when } 0 \leq \text{Hue} (H) < 300)$$

$$\text{Hue}' (H) = \text{Hue} (H) - 300 \text{ (when } 300 \leq \text{Hue} (H) < 360)$$

$$\text{Luminas } (Y) = InR \times 0.30 + InG \times 0.59 + InB \times 0.11 \quad (1)$$

Under the above conditions, $$\text{Hue}'(H)/\text{Brightness } (Y) < 3.0 \times \text{Saturation } (S)/255 + 0.7 \quad (2)$$

Thus, the number of divided areas of image data will be 28, which is derived from 4×7=28. Here, Brightness (V) may be used in formulas (1) and (2).

Once the two dimensional histogram is formed, the first occupancy rate calculation unit 718 calculates the first occupancy rate showing the rate occupying the cumulative pixels calculated to each area against the entire number of pixels (an entire photographing image) (STEP S313). Then the first occupancy rate calculation process will end. The first occupancy rate calculated for the area formed by the combination of a brightness area vi and a hue area Hj is set as Rij. Then the first occupancy rate in each divided area will be as shown in Table 1.

TABLE 1

[FIRST OCCUPANCY RATE]

|  | H1 | H2 | H3 | H4 |
|---|---|---|---|---|
| v1 | R11 | R12 | R13 | R14 |
| v2 | R21 | R22 | R23 | R24 |
| v3 | R31 | R32 | R33 | R34 |
| v4 | R41 | R42 | R43 | R44 |
| v5 | R51 | R52 | R53 | R54 |
| v6 | R61 | R62 | R63 | R64 |
| v7 | R71 | R72 | R73 | R74 |

Next, the second occupancy rate calculation unit 719 executes the second occupancy rate calculate process for calculating the second occupancy rate used for calculating the third index a3 (STEP S32).

Figure 9:
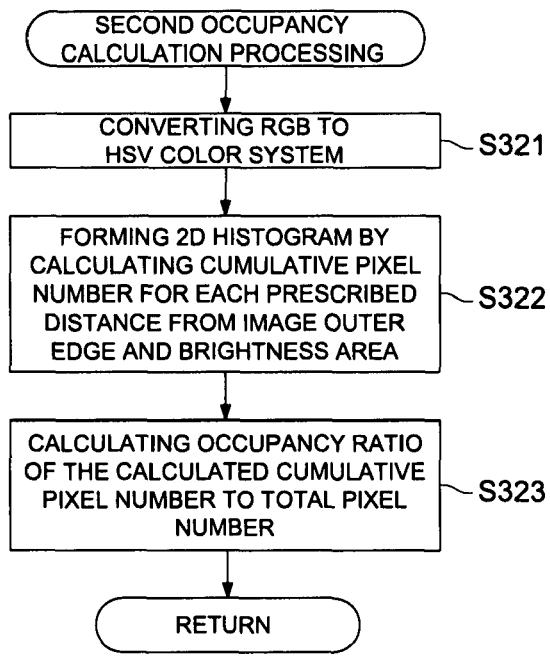
FIG. 9 illustrates a flowchart showing the second occupancy calculation process under a scene discrimination process.
Figure 10:
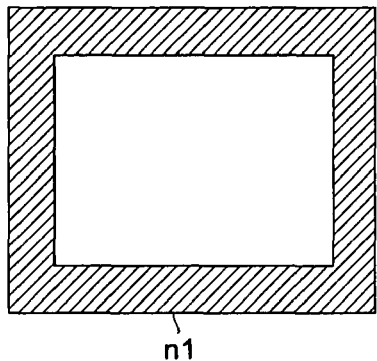
FIG. 10 illustrates areas n1-n4, which have been divided corresponding to the distance from the external edge of an image data screen.
Figure 10:
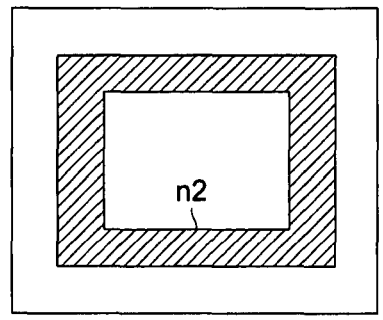
Figure 10:
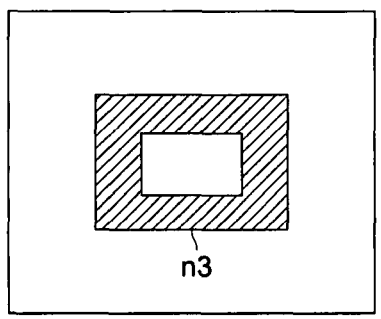
Figure 10:
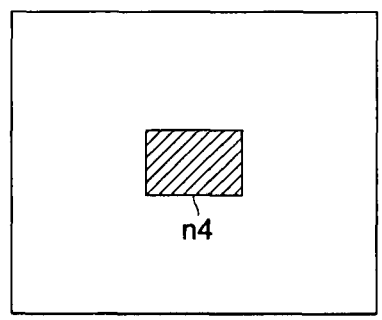

FIG. 9 illustrates a flowchart showing the second occupancy calculation process under a scene discrimination process. As illustrated in FIG. 9, on the second occupancy rate calculation process of STEP S32, firstly, the color system conversion unit 715 converts the RGB value of the image data to the HSV color system (STEP 321). STEP 321 may be combined with STEP S311 to form a common STEP. Next, the histogram creating unit 716 divides the image data into an area formed by the combination of the distance from the external edge of the screen of the image data and brightness, and two-dimensional histogram is formed by calculating the cumulative pixels of each divided area (STEP S322). Hereinafter, the area divide of the image data will be described in detail FIGS. 10(a)-(d) illustrate areas n1-n4, which have been divided according to the distance from the external edge of an image data screen. The area n1 illustrated in FIG. 10(a) is an external frame. The area n2 illustrated in FIG. 10(b) is an inside of the external frame. The area n3 illustrated in FIG. 10(c) is further inside the area n2. The area n4 illustrated in FIG. 10(d) is a central area of the photographed image screen. Further, brightness is to be divided into 7 areas v1-v7 as described above. Thus, the number of the divided area in case when dividing the image data into areas formed by the combination of the distance from the external edge of the photographed image screen and brightness will be 28, which comes from the formula 4×7=28.

Once a two-dimensional histogram is formed, the second occupancy rate calculation unit 719 calculates the second occupancy rate expressing the rate occupying the cumulative pixels calculated to each area against the entire number of pixels (an entire photographing image) (STEP S323). Then the second occupancy rate calculation process will end. The second occupancy rate calculated for the area formed by the combination of a brightness area vi and a screen area nj is set as Qij. Then the second occupancy rate in each divided area will be as illustrated in Table 2.

TABLE 2

| [SECOND OCCUPANCY RATE] | | | |
|---|---|---|---|
| | n1 | n2 | n3 | n4 |
| v1 | Q11 | Q12 | Q13 | Q14 |
| v2 | Q21 | Q22 | Q23 | Q24 |
| v3 | Q31 | Q32 | Q33 | Q34 |
| v4 | Q41 | Q42 | Q43 | Q44 |
| v5 | Q51 | Q52 | Q53 | Q54 |
| v6 | Q61 | Q62 | Q63 | Q64 |
| v7 | Q71 | Q72 | Q73 | Q74 |

Next, in FIG. 7, the first index calculation unit 720 multiplies the first and second coefficients set in advance according to the photographic conditions to the first occupancy rate calculated by the rate calculation unit 712. Then, the first index calculation unit 720 calculates the first and second indexes a1 and a2 as indexes for specifying the photographic scene (to quantitatively describe light source conditions). The second index calculation unit 721 multiplies the third indexes a3 as index set in advance according to the photographic conditions to the second occupancy rate calculated in the ratio calculation unit 712 and calculates the third index a3 for specifying the photographic scene (STEP S33).

Table 3 shows the reliability as a strobe photographing. Namely, Table 3 shows the coefficient in each divided area necessary to calculate the first coefficients for calculating the first index a1 quantitatively expressing the brightness state of the face area when photographing with a strobe. The coefficient of each divided area shown in Table 3 is weighting coefficients to be multiplied to the first occupancy rates Rij of each divided area shown in Table 1.

TABLE 3

| [FIRST COEFFICIENT] | | | |
|---|---|---|---|
| | H1 | H2 | H3 | H4 |
| v1 | −44.0 | 0.0 | 0.0 | 0.0 |
| v2 | −16.0 | 8.6 | −6.3 | −1.8 |
| v3 | −8.9 | 0.9 | −8.6 | −6.3 |
| v4 | −3.6 | −10.8 | −10.9 | −7.3 |
| v5 | 13.1 | 20.9 | −25.8 | −9.3 |
| v6 | 8.3 | −11.3 | 0.0 | −12.0 |
| v7 | −11.3 | −11.1 | −10.0 | −14.6 |

Figure 11:
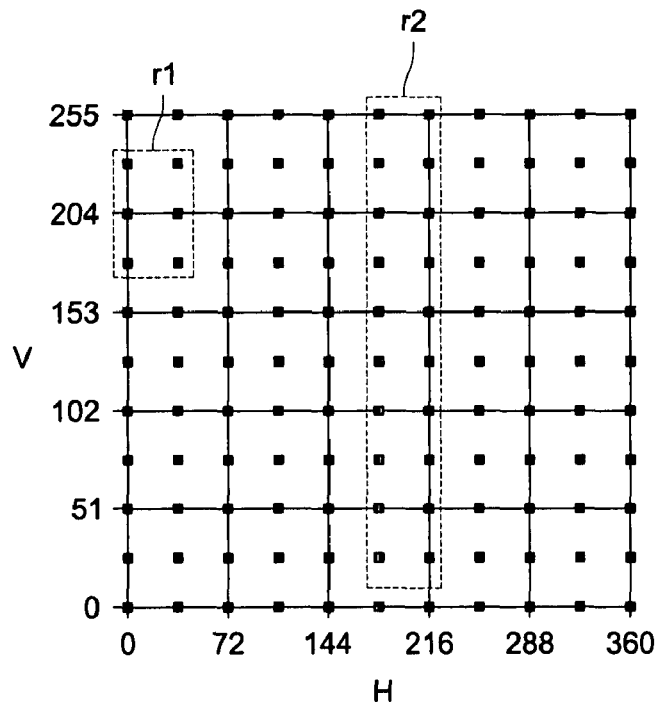
FIG. 11 illustrates a brightness (V)-Hue (H) plane and, an area r1 and an area r2 on a V-H plane.
Figure 12:
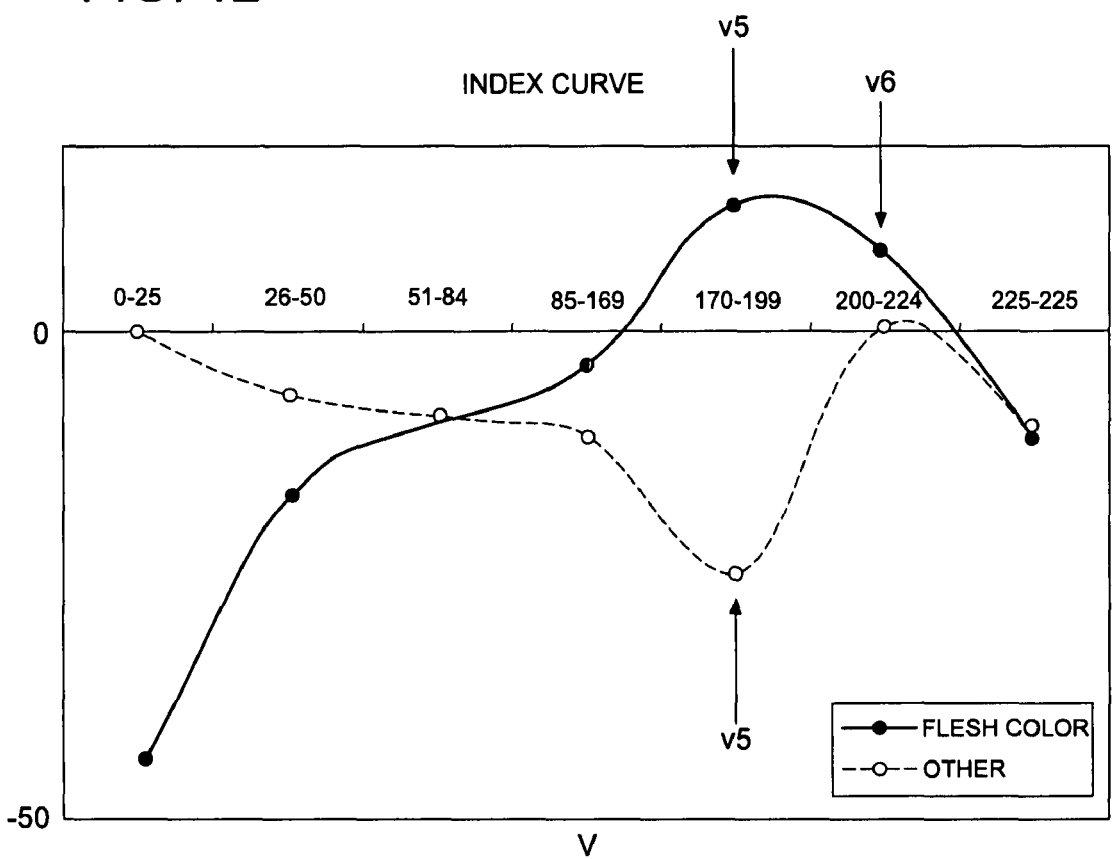
FIG. 12 illustrates a curve showing a first coefficient, which is multiplied to the first occupancy rate in order to calculate the first index a1.

FIG. 11 illustrates a brightness (V)-Hue (H) plane. In FIG. 11, a positive (+) coefficient is used for the first occupancy rate calculated from the area (r1) distributed in the high brightness skin color hue area and a negative (−) coefficient is used for the first occupancy rate calculated from the blue color hue area (r2), which is the other hue. FIG. 12 illustrates the first coefficient in the skin color area (H1) and the first coefficient in the other area (a green color hue area (H3)) as a curve (coefficient curve), which continuously changes over entire brightness. According to Table 3 and FIG. 12, in high brightness area (v=170-240), the sign of the first coefficient in the skin color area (H1) is positive (+), and the sign of the first coefficient in the other area (for example, a green color hue area (H3)), is negative (−). It is apparent that both sings are different to each other.

In case when the first coefficient in brightness area vi and the hue area Hj is set to Cij, the summation of Hk area for calculating the first index a1 is defined as formula (3).

[Formula 1]

$$\text{Summation of } Hk \text{ area} = \Sigma\, Rik \times Cik \quad (3)$$

where i=from 1 to 7

Thus, the summation of H1-H4 areas will be expressed as following formulas (3-1)-(3-4).

$$\text{Summation of } H1 \text{ area} = R11 \times (-44.0) + R21 \times 8.6 \times (-16.o) + (\text{middle portion is omitted}) \ldots + R71 \times (-11.3) \quad (3\text{-}1)$$

$$\text{Summation of } H2 \text{ area} = R12 \times 0.0 + R22 \times 8.6 + (\text{middle portion is omitted}) \ldots + R72 \times (-11.1) \quad (3\text{-}2)$$

$$\text{Summation of } H3 \text{ area} = R13 \times 0.0 + R23 \times (-6.3) + (\text{middle portion is omitted}) \ldots + R73 \times (-10.0) \quad (3\text{-}3)$$

$$\text{Summation of } H4 \text{ area} = R14 \times 0.0 + 24 \times (-1.8) + (\text{middle portion is omitted}) \ldots + R74 \times (-14.6) \quad (3\text{-}4)$$

The first index a1 is defined by formula (4) by using the summations of H1-H4 areas expressed by formulas (3-1)-(3-4).

$$a1 = \text{summation of } H1 \text{ area} + \text{summation of } H2 \text{ area} + \text{summation of } H3 \text{ area} + \text{summation of } H4 \text{ area} + 4.24 \quad (4)$$

Table 4 illustrates the reliability as backlighting, namely, Table 4 illustrates the second coefficient for each divided area, which is necessary to calculate the second index a2 showing the brightness state of a face area when photographing in backlighting. The coefficients shown in the Table 4 are weighting coefficient, which will be multiplied to the first occupancy rate Rij of each divided area shown in Table 1.

TABLE 4

[SECOND COEFFICIENT]

|    | H1    | H2    | H3    | H4   |
|----|-------|-------|-------|------|
| v1 | −27.0 | 0.0   | 0.0   | 0.0  |
| v2 | 4.5   | 4.7   | 0.0   | −5.1 |
| v3 | 10.2  | 9.5   | 0.0   | −3.4 |
| v4 | −7.3  | −12.7 | −6.5  | −1.1 |
| v5 | −10.9 | −15.1 | −12.9 | 2.3  |
| v6 | −5.5  | 10.5  | 0.0   | 4.9  |
| v7 | −24.0 | −8.5  | 0.0   | 7.2  |

TABLE 5

[THIRD COEFFICIENT]

|    | n1   | n2    | n3   | n4    |
|----|------|-------|------|-------|
| v1 | 40.1 | −14.8 | 24.6 | 1.5   |
| v2 | 37.0 | −10.5 | 12.1 | −32.9 |
| v3 | 34.0 | −8.0  | 0.0  | 0.0   |
| v4 | 27.0 | 2.4   | 0.0  | 0.0   |
| v5 | 10.0 | 12.7  | 0.0  | −10.1 |
| v6 | 20.0 | 0.0   | 5.8  | 104.4 |
| v7 | 22.0 | 0.0   | 10.1 | −52.2 |

Figure 13:
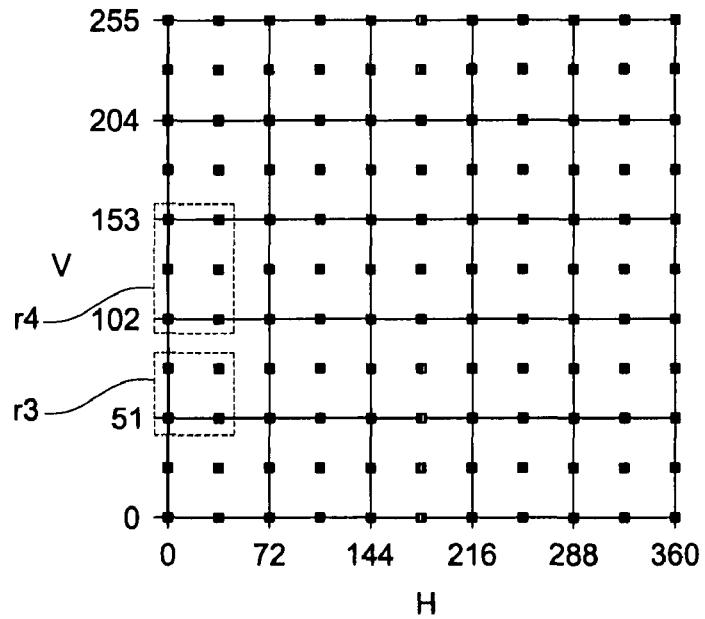
FIG. 13 illustrates a brightness (V)-Hue (H) plane and an area r3 and an area r4 on a V-H plane.
Figure 14:
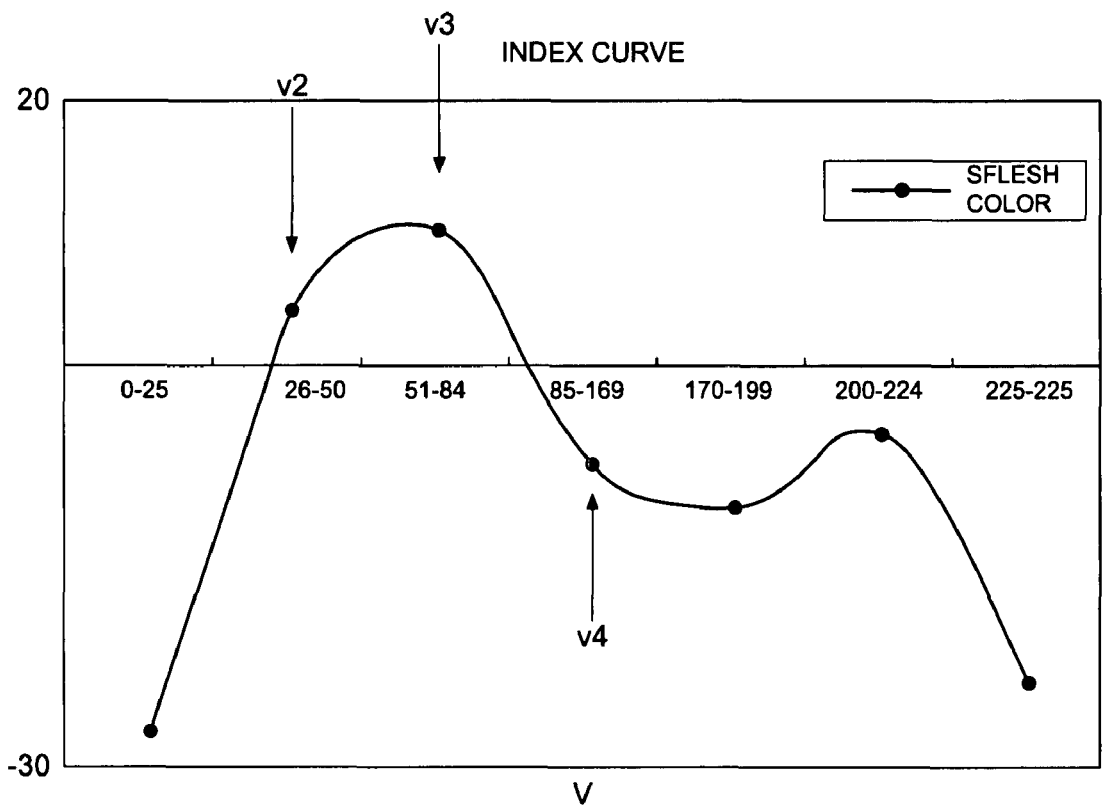
FIG. 14 illustrates a curve showing a second coefficient, which is multiplied to the first occupancy rate in order to calculate the second index a2.

FIG. 13 illustrates a brightness (V)-hue (H) plane. In FIG. 13, a negative (−) coefficient is used to the first occupancy rate calculated from area (r4) distributed in the middle bright of the skin color hue area and a positive (+) coefficient calculated from a low brightness (shadow) area (r3) of skin color hue area. FIG. 14 illustrates the second coefficient in the skin color area (H) as a curve (coefficient curve) continuously changing across the entire brightness. According to Table 4 and FIG. 14, it is apparent that the sign of the second coefficient in the middle brightness of brightness value of 85-169 (v4) in the skin color hue area is negative (−), the sign of the second coefficient in the low brightness of brightness value of 26-84 (v2, v3) is positive (+) and the sings of both coefficients in both areas are different each other.

In case when the second coefficient in brightness area vi and the hue area Hj is set to Dij, the summation of Hk area for calculating the second index a2 is defined as formula (5).

[Formula 2]

$$\text{Summation of } Hk \text{ area} = \Sigma Rik \times Dik \tag{5}$$

where i=from 1 to 7

Thus, the summations of H1-H4 are expressed as following formulas (5-1)-(5-4).

$$\text{Summation of } H1 \text{ area} = R11 \times (-27.0) + R21 \times 4.5 + \text{(middle portion is omitted)} \ldots + R71 \times (-24.0) \tag{5-1}$$

$$\text{Summation of } H2 \text{ area} = R12 \times 0.0 + R22 \times 4.7 + \text{(middle portion is omitted)} \ldots + R72 \times (-8.5) \tag{5-2}$$

$$\text{Summation of } H3 \text{ area} = R13 \times 0.0 + R23 \times 0.0 + \text{(middle portion is omitted)} \ldots + R73 \times 0.0 \tag{5-3}$$

$$\text{Summation of } H4 \text{ area} = R14 \times 0.0 + R24 \times (-5.1) + \text{(middle portion is omitted)} \ldots + R74 \times 7.2 \tag{5-4}$$

The second index a2 is defined by a formula (6) by using the summations of H1-H4 areas expressed by formulas (5-1)-(5-4).

$$a2 = \text{summation of } H1 \text{ area} + \text{summation of } H2 \text{ area} + \text{summation of } H3 \text{ area} + \text{summation of } H4 \text{ area} + 1.554 \tag{6}$$

Since the first and second indexes a1 and a2 are calculated based on the distribution of brightness and hue of the image data, it is effective to discriminate the photographic scene when the image data is for a color image.

Next, the third coefficients to each divided area, which is necessary to calculate the third index a3, is shown in Table 5. The coefficient to each divided area shown in Table 5 is a weighting coefficient to be multiplied to the second occupancy rate Qij of each divided area shown in Table 2, which is set corresponding to the photographic conditions.

Figure 15:
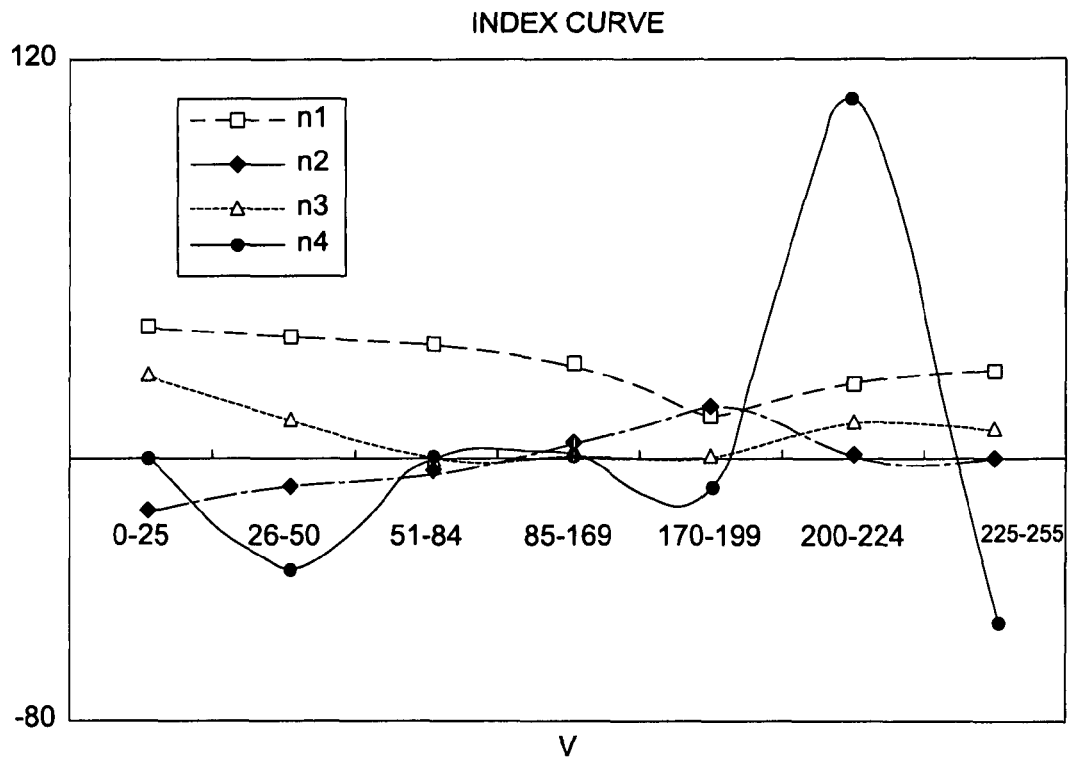
FIG. 15 illustrates a curve showing a third coefficient, which is multiplied to the second occupancy rate in order to calculate the third index a3 separately shown in the areas n1-n4.

FIG. 15 illustrates the third coefficients in the screen areas n1-n4 as curves (coefficient curves) continuously changing across the entire brightness.

In case when the third coefficient in brightness area vi and the hue area Hj is set to Eij, the summation of Hk area for calculating the third index a3 is defined as formula (7).

[Formula 3]

$$\text{Summation of } Hk \text{ area} = \Sigma Qik \times Eik \tag{7}$$

where i=from 1 to 7

Thus, the summations of areas n1-n4 are expressed by following formulas (7-1)-(7-4).

$$\text{Summation of } n1 \text{ area} = Q11 \times 40.1 + Q21 \times 37.0 + \text{(middle portion is omitted)} \ldots + Q71 \times 22.0 \tag{7-1}$$

$$\text{Summation of } n2 \text{ area} = Q12 \times (-14.8) + Q22 \times (-10.5) + \text{(middle portion is omitted)} \ldots + Q72 \times 0.0 \tag{7-2}$$

$$\text{Summation of } n3 \text{ area} = Q13 \times 24.6 + Q23 \times 12.1 + \text{(middle portion is omitted)} \ldots + Q73 \times 10.1) \tag{7-3}$$

$$\text{Summation of } n4 \text{ area} = Q14 \times 1.5 + Q24 \times (-32.9) + \text{(middle portion is omitted)} \ldots + Q74 \times (-52.2) \tag{7-4}$$

The third index a3 is defined by formula (8) by using the summations of n1-n4 areas expressed by formulas (7-1)-(7-4).

$$a3 = \text{summation of } n1 \text{ area} + \text{summation of } n2 \text{ area} + \text{summation of } n3 \text{ area} + \text{summation of } n4 \text{ area} - 12.6201 \tag{8}$$

Since the third index a3 is calculated based on the structural features (distance from the external edge of the image) by the distribution position of brightness of the image data, the third index a3 is effective to determine not only a color image but also a monochrome image.

Next, in FIG. 7, the third index calculation unit 722 executes the fourth index calculation process for calculating the fourth index a4 as the index for specifying the photographic scene (STEP S34).

Figure 16:
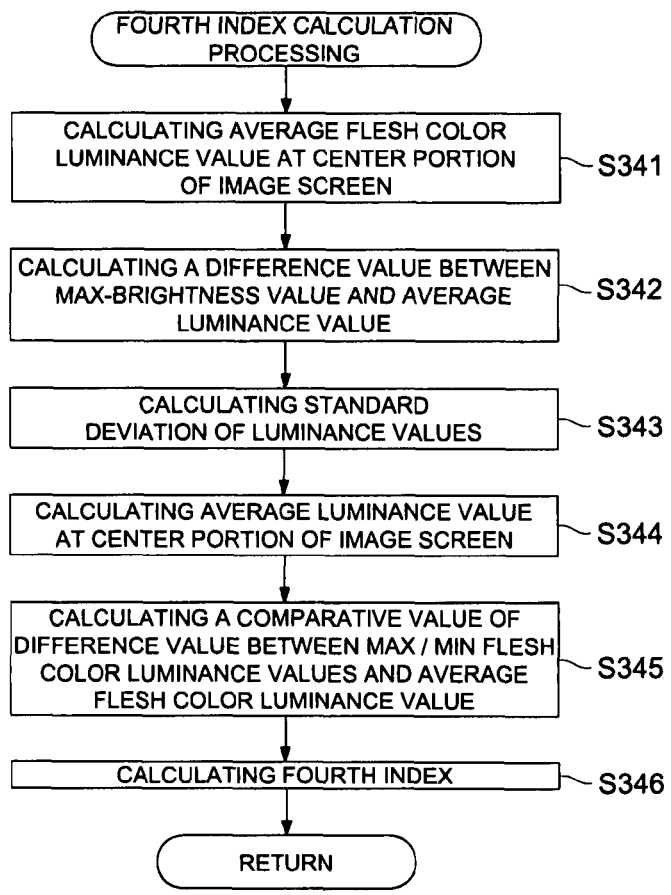
FIG. 16 illustrates a flowchart showing the fourth index calculation process under the scene discrimination process.

FIG. 16 illustrates a flowchart showing the fourth index calculation process under the scene discrimination process. As shown in FIG. 16, in the fourth index calculation process, the third index calculation unit 722 calculates the luminance Y by using the formula (1) from RGB value of image data and the skin color average-luminance value x1 in the screen center of the image data. Then, the third index calculation unit 722 calculates the differential value x2 between the maximum luminance value and the average luminance value of the image data (STEP 341). Then, the differential value between the maximum-luminance value and the luminance brightness value x2 is calculated by the third index calculation unit (STEP S342). The differential value between the maximum-luminance value and the luminance brightness value x2 is expressed by next formula (9).

$$X2 = Y\max - Y\text{ave} \tag{9}$$

Then, the third index calculation unit 722 calculates the luminance standard deviation x3 (STEP S343). Then, the third index calculation unit 722 calculates the average luminance value x4 in the screen center of the image data (STEP S344). Then, the third index calculation unit 722 calculates the differential value between the skin color maximum luminance value and the skin color luminance brightness value of image data and the relative value with a skin color average luminance x5 (STEP S345). The relative value between the differential value between the skin color maximum luminance value and the skin color minimum luminance value of image data, and the skin color average luminance value x5, is expressed by following formula (10).

$$x5 = (Y\text{skin max} - Y\text{skin min})/2 - Y\text{skin ave} \quad (10)$$

Then, the third index calculation unit 722 multiplies the fourth coefficient set in advance corresponding to the photographic conditions to the average luminance value of skin color in the screen center portion x1, the differential value between the maximum luminance value and the minimum luminance value of the screen x2, the luminance standard deviation x3, the average luminance in the screen center portion x4 and the relative value between the maximum skin color luminance value and the skin color minimum luminance value of the image and the skin color average luminance value x5 (STEP S346). Then, the third index calculation unit 722 ends the fourth index calculation process.

The fourth index a4 is defined by formula (11).

$$a4 = 0.06 \times x1 + 1.13 \times x2 + 0.02 \times x3 + (-0.01) \times x4 + 0.03 \times x5 - 6.50 \quad (11)$$

The fourth index a4 includes not only structural features of the screen of the image data but also luminance histogram distribution information, which is effective for particularly discriminating the strobe photographing scene and the under lighting photographing scene.

Next, in FIG. 7, the third index calculation unit 722 calculates the fifth index a5 and the sixth index a6 as indexes for specifying a photographic scene (STEP S35).

Here, set the skin color average luminance value in the screen center portion of the image data to the fourth dash index a 4'. Here, the screen center portion denotes an area configured by, for example, the areas n2, n3 and n4. The fifth index a5 is defined by using a formula (12) by using the first index a1, the third index a3 and the fourth dash index a4'. The sixth index a6 is defined by using a formula (13) by using the second index a2, the third index a3 and the fourth dash index a4'.

$$a5 = 0.46 \times a1 + 0.61 \times a3 + 0.01 \times a4' - 0.79 \quad (12)$$

$$a6 = 0.58 \times a2 + 0.18 \times a3 + (-0.03) \times a4' + 3.34 \quad (13)$$

Here, the weighting coefficients to be multiplied to respective indexes in formulas (12) and (13) are set corresponding to the photographic conditions.

Then, in FIG. 7, the scene discrimination execution unit 714 discriminates a photographic scene of image data based on the fourth index a4, the fifth index a5 and the sixth index a6, which have been calculated by the index calculation unit 713 (STEP S36) and the scene description process ends. Hereinafter, the photographic scene discrimination method will be described.

Figure 17A:
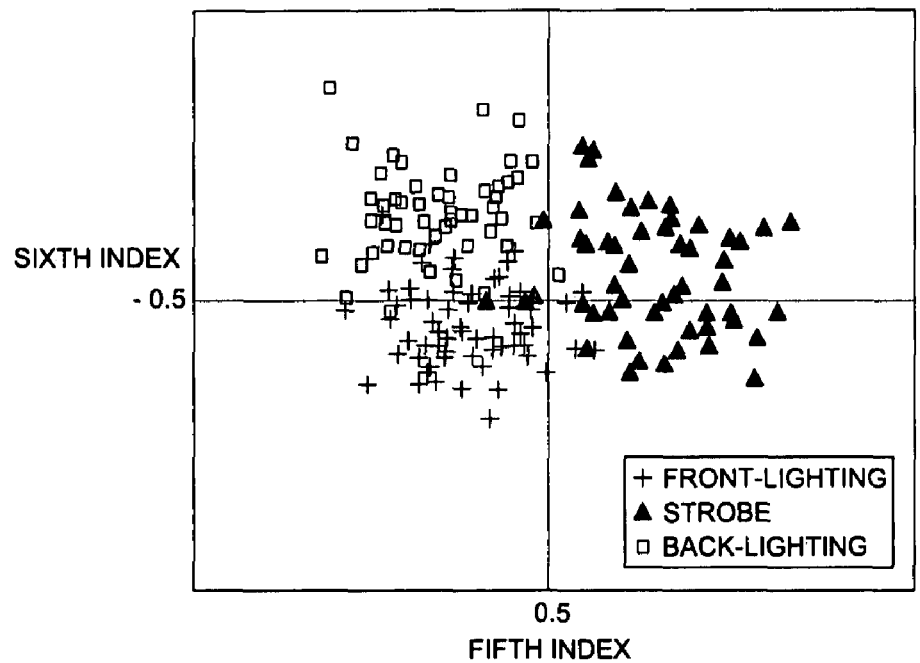
FIG. 17(a) illustrates a plot drawing showing the relationship between a photographic scene and a fifth index a5 and a sixth index a6. (b) illustrates a plot drawing showing the relationship between a photographic scene and a fourth index a4 and a fifth index a5.
Figure 17B:
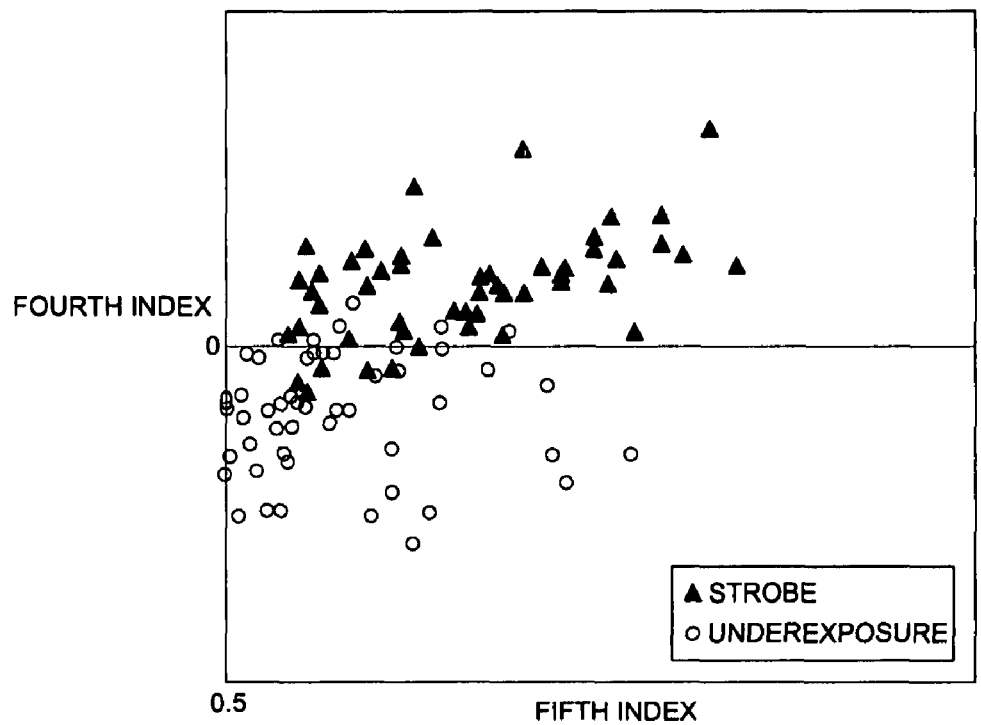

FIG. 17(*a*) illustrates a graph, onto which the values of the fifth index a5 and the sixth index a6 have been plotted after photographing total 180 photographs of lighting conditions of 60 photographs in a front lighting, 60 photographs in a backlighting and 60 photographs in a strobe and calculating the fifth indexes a5 and the sixth indexes of the digital image data of the total 180 photographs. According to the FIG. 17(*a*), in case when the value of the fifth index a5 is larger than 0.5, there are many strobe scenes. In case when the value of the fifth index a5 is not more than the 0.5 and the value of the sixth index a6 is more than −0.5, there are many backlighting photographing scenes. In case when the value of the fifth index a5 is not more than the 0.5 and the value of the sixth index a6 is not more than −0.5, there are many front lighting photographing scenes. As described above, the photographic scene can be quantitatively discriminated by utilizing the values of the fifth index a5 and the sixth index a6.

In addition to the fifth index a5 and the sixth index a6, which are capable of discriminating respective photographic scenes of front lighting and backlighting, by adding the fourth index a4, the discrimination accuracy of the photographic scene can be further improved. The fourth index a4 is particularly effective to discriminating the strobe scene, in which the gradation correction for darkening the entire image is executed, and the under-lighting photographic scene, in which the gradation correction for lightning the entire image is executed.

FIG. 17(*b*) illustrates a graph, onto which the fourth and fifth indexes a4 and a5 of the image data having the fifth index a5 of more than 0.5 among 60 photographs in a strobe scene and 60 photographs in an under lighting scene are plotted. According to the FIG. 17(*b*), in case when the value of the fourth index a4 is larger than 0 (zero), there are many strobe scenes. In case when the value of the fourth index a4 is not more than the 0, there are many under lighting photographing scenes. The discrimination contents of the photographic scene based on the fourth index a4-the sixth index a6 are shown in Table 6.

TABLE 6

|  | Fourth Index a4 | Fifth Index a5 | Sixth Index a6 |
|---|---|---|---|
| Front lighting | * | Not more than 0.5 | Not more than −0.5 |
| Backlighting | * | Not more than 0.5 | More than −0.5 |
| Strobe | More than 0 | More than 0.5 | * |
| Under lighting | Not more than 0 | More than 0.5 | * |

Figure 18:
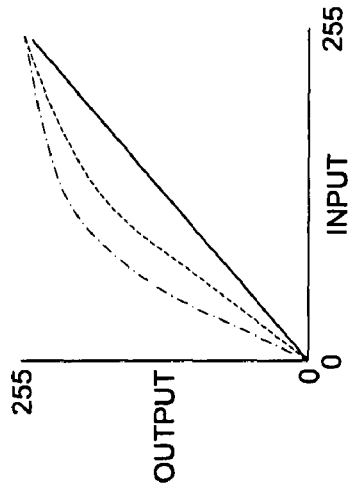
FIG. 18 illustrates a gradation correction curve corresponding to respective gradation correction methods.
Figure 18:
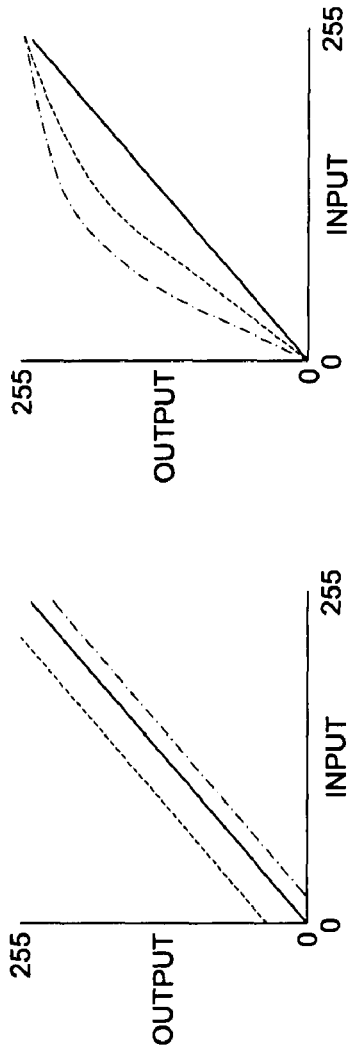
Figure 18:
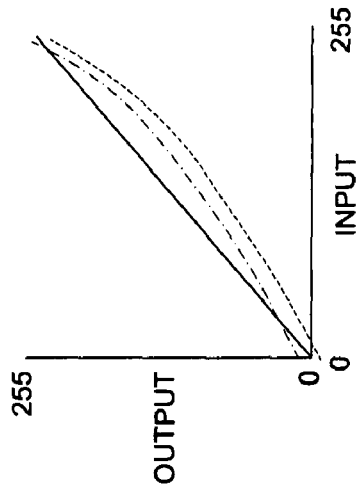

Then, in FIG. 6, the gradation correction method decision unit 730 determines the gradation correction method for the image data based on the scene determination result of the photographic scene discriminated in STEP S3. The gradation correction parameter calculation unit 731 calculates the parameter (gradation correction parameter) necessary for the gradation correction based on the index calculated by the index calculation unit 713. The first gradation correction decision unit 732 determines the first gradation correction amount based on the calculated gradation correction parameter (STEP 4). As illustrated in FIG. 18, in case when the photographic scene is front lighting, a gradation correction method A (FIG. 18(*a*)) is selected in the determination of the gradation correction method. In case when the photographic scene is backlighting, a gradation correction method B (FIG. 18(*b*)) is selected. In case when the photographic scene is strobe, a gradation correction method C (FIG. 18(*c*)) is selected. In case when the photographic scene is under lighting, a gradation correction method B (FIG. 18(*b*)) is selected.

Hereinafter, the calculation method for gradation correction parameter calculated in STEP S4 will be described. Meanwhile, hereinafter, 8 bit image data is to have been converted into 16 bit image data, and the unit of the image data is to be 16 bit.

Parameters P1-P9 below are calculated as necessary parameters (gradation correction parameters) for gradation correction.

P1: Average luminance of an entire photographing image
P2: Average luminance of a divided block
P3: Average luminance of a skin color area (H1)
P4: First luminance correction value=P1-P2
P5: Reproduced target correction value=Luminance reproduced target value (30360)=P4
P6: First offset value=P5-P1
P7: First key correction value
P7': Second key correction value
P8: Second luminance correction value
P9: Second offset value=P5-P8-P1

Figure 19:
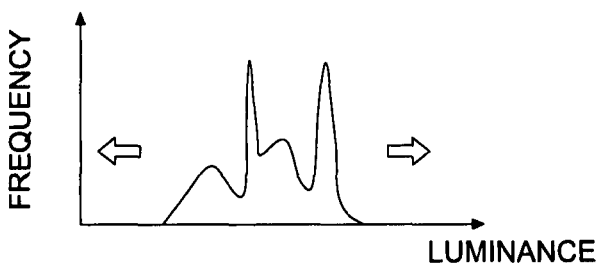
FIG. 19(a) illustrates a luminance frequency distribution (histogram), (b) illustrates a normalized histogram and (c) illustrates a histogram divided into blocks.
Figure 19:
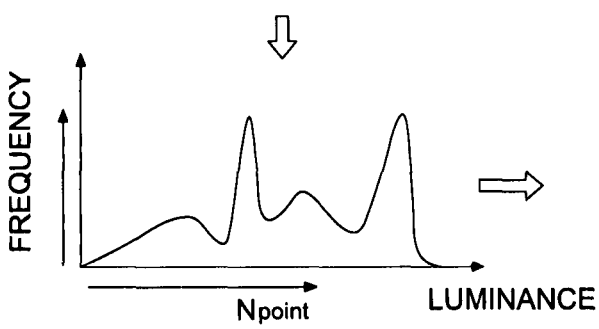
Figure 19:
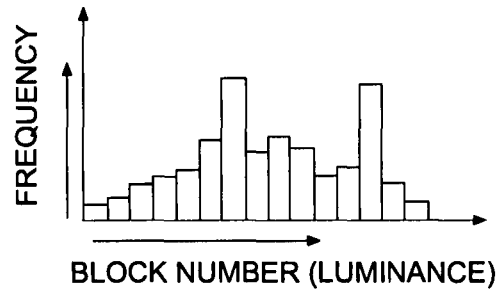
Figure 20:
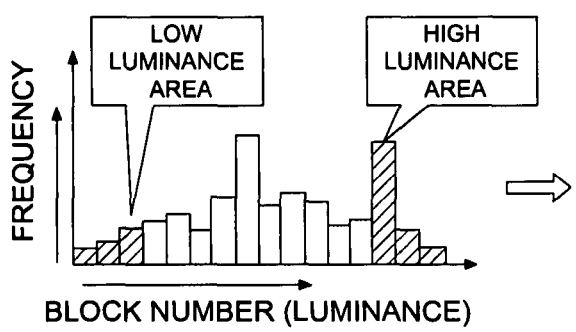
FIGS. 20(a) and (b) illustrate explanation of omission of a low luminance area and a high luminance area from a luminance histogram.
FIGS. 20(c) and (d) illustrate explanation of the limitation of the frequency of brightness.
Figure 20:
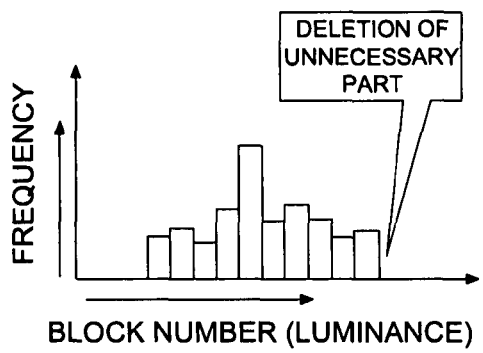
Figure 20:
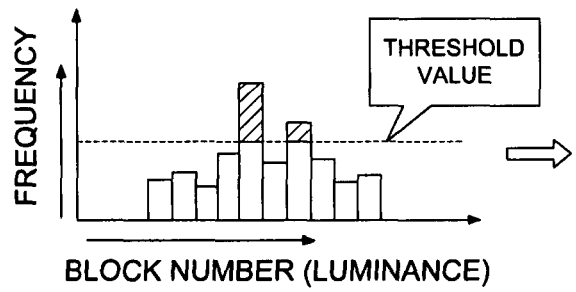
Figure 20:
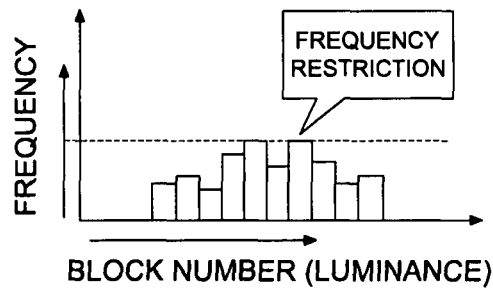

Next, a calculation method for the parameter P2 will be described by referring to FIGS. 19-20. In order to normalize the image data, CDF (Cumulative Density Function) is formed. Next, the maximum value and the minimum value are determined from the obtained CDF. The maximum value and the minimum value are obtained in each RGB. Set the obtained maximum value and the minimum values respectively as Rmax, Rmin, Gmax, Gmin, Bmax and Bmin.

Next, the normalized image data to an arbitrary pixel (Rx, Gx, Bx) of image data is calculated. In the case of putting that the normalized data of Rx on R plane is set $R_{point}$, the normalized data of Gx on G plane is set $G_{point}$ and the normalized data of Bx on B plane is set $B_{point}$, the normalized data $R_{point}$, $G_{point}$ and $G_{point}$ are respectively expressed as formulas (14)-(16).

$$R_{point}=\{(Rx-R\min)/(R\max-R\min)\}\times 65535 \quad (14)$$

$$G_{point}=\{(Gx-G\min)/(G\max-G\min)\}\times 65535 \quad (15)$$

$$B_{point}=\{(Bx-B\min)/(B\max-B\min)\}\times 65535 \quad (16)$$

Next, the luminance $N_{point}$ of pixel (Rx, Gx, Bx) is calculated by a formula (17).

$$N_{point}=(B_{point}+G_{point}+R_{point})/3 \quad (17)$$

FIG. 19(a) illustrates a luminance histogram of RGB pixels before normalization. In FIG. 19(a), the horizontal axis represents luminance, the vertical axis represents the frequency of pixel. This histogram is formed to each RGB. Once the luminance histogram has formed, the normalization of image data is executed in each plane by using formula (14)-(16). FIG. 19(b) illustrated a luminance histogram calculated by the formula (17). Since the image data is normalized by 65535, each pixel can be arbitrary value between the maximum value 65535 and minimum value 0.

A frequency distribution as shown in FIG. 19(c) can be obtained by diving the luminance histogram illustrated in FIG. 19(b) by a predetermined range and dividing into blocks. In FIG. 19(c), the horizontal axis represents a block number (luminance) and the vertical axis represents frequency.

Next, the process for removing highlight and shadow areas from the luminance histogram illustrated in FIG. 10(c) will be executed. Since in a white wall scene or a snow scene, the highlight and shadow areas give a bad inference on an average luminance control. Thus, by limiting the highlight and shadow areas on the luminance histogram illustrated in FIG. 19(c), the inference of both areas can be reduced. By removing high brightness area (highlight area) and a low brightness area (shadow area) from the luminance histogram illustrated in FIG. 20(a) (or FIG. 19(c)), the results becomes the graph as illustrated in FIG. 20 (b).

Next, as illustrated in FIG. 20(c), in the luminance histogram, the area whose frequency is more than the threshold value will be removed. In case that there is an area whose frequency is extremely high, since the data of this area strongly affects the average luminance of the entire photographic image, erroneous correction tends to occur. Thus, as shown in FIG. 20(c), the pixels not less than the threshold value are limited on the luminance histogram. FIG. 20(d) illustrated the luminance histogram after the limitation process of the image pixel has been executed.

The high luminance area and the low luminance area are removed from a normalized luminance histogram. A parameter P2 is obtained by calculating the luminance average value based on the respective block numbers in the luminance histogram obtained by limiting the cumulative pixel number and respective frequencies.

A parameter P1 is the average value of the luminance of entire image data. A parameter P3 is the average value of the luminance of skin color area (H1) among the image data. The first key correction value of a parameter P7, the second key correction value of a parameter P7', the second luminance correction value of a parameter P8 are respectively defined as formulas (18)-(20).

$$P7 \text{ (first key correction value)}=\{P3-((a6/6)\times 18000+22000)\}/24.78 \quad (18)$$

$$P7' \text{ (second key correction value)}=\{P3-((a4/6)\times 10000+30000)\}/24.78 \quad (19)$$

$$P8 \text{ (first key correction value)}=(a5/6)\times 17500 \quad (20)$$

In the process on the determination of the first gradation correction amount of the image data based on the calculated gradation correction parameters, more specifically, the gradation correction curve corresponding to the calculated gradation parameter is selected (determined) among a plurality of gradation correction curves set in advance corresponding to the determined gradation correction method. The gradation correction curve (gradation correction amount) may be calculated based on the calculated gradation correction parameters.

The gradation correction curve of respective photographic scenes will be described hereinafter.

<In Case of Front Lighting>

In case when the photographic scene is front lighting, an offset correction (parallel shift of 8 bit value) for coinciding parameters P1 to P5 is performed by following formula (21).

$$RGB \text{ value of output image}=RGB \text{ value of input image}+P6 \quad (21)$$

Thus, in case when the photographic scene is front lighting, the gradation correction curve corresponding to the formula (21) is selected from a plurality of gradation correction curves illustrated in FIG. 18(a). Further, the gradation correction curve may be calculated (determined) based on the formula (21).

<In Case of Backlighting>

Figure 21:
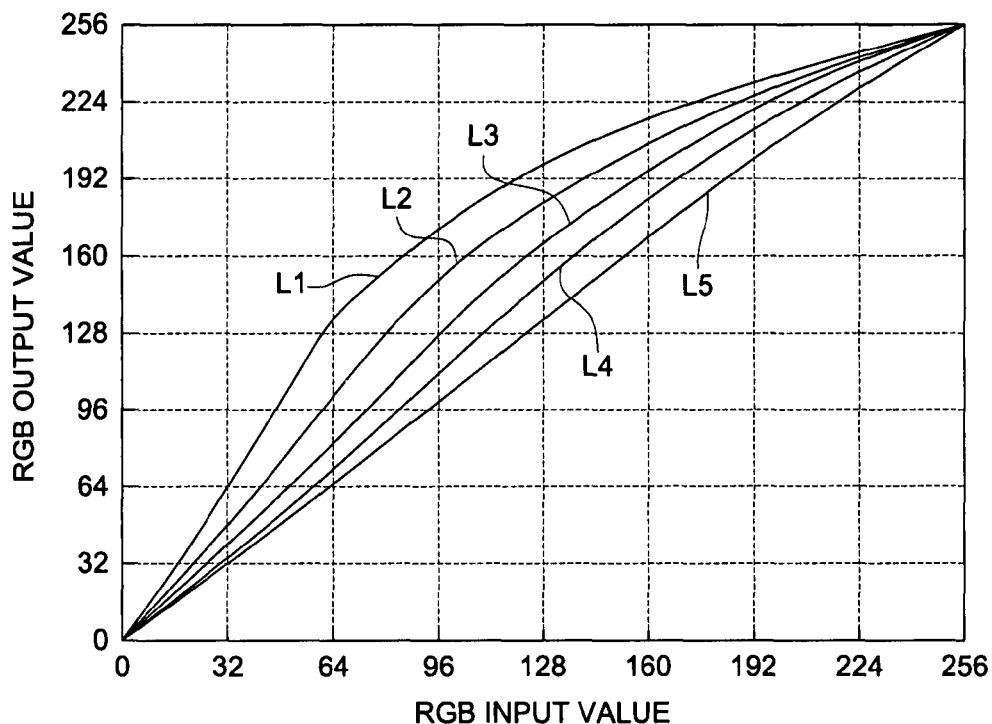
FIG. 21 illustrates a gradation correction curve showing an image process condition (gradation correction condition) in case of a backlighting scene.

In case when the photographic scene is backlighting, the gradation correction curve corresponding to the parameter P7 (first key correction value) shown by the formula (18) is selected from a plurality of gradation correction curves illustrated in FIG. 18(b). The concrete example of the gradation correction curve illustrated in FIG. 18(b) is shown in FIG. 21. Corresponding relationship between the parameter P7 and the gradation correction curve to be selected will be shown hereinafter.

In case when $-50<P7<+50$, $->$ L3

In case when $+50\leq P7<+150$, $->$ L4

In case when +150<P7'<+250, –>                         L5

In case when –150<P7'≦–50, –>                          L2

In case when –250<P7'≦–150, –>                         L1

Meanwhile, in case when the photographic scene is backlighting, a dodging process is preferably conducted together with the gradation correction process. In this case, the degree of the dodging process is preferably adjusted corresponding to the fifth index a5 indicating the degree of backlighting.

<In Case of Under Lighting>

In case when the photographing is under lighting, the gradation correction curve corresponding to the parameter P7' (the second key correction value) shown in the formula (19) is selected from a plurality of gradation correction curves shown in FIG. 18(b). More specifically, as the same as selection method of the gradation correction curve in case when the photographic scene is backlighting, the gradation correction curve corresponding to the value of parameter p7' is selected from the gradation correction curves illustrated in FIG. 21. Meanwhile, when the photographic scene is under lighting, the dodging process as shown when the backlight is not executed.

<In Case of Strobe>

In case when the photographic scene is strobe, an offset correction (parallel shift of 8 bit value) will be performed by utilizing the following formula (22).

$$RGB \text{ value of an output image}=RGB \text{ value of an input image}+P9 \quad (22)$$

Thus, in case when the photographic scene is strobe, the gradation correction curve corresponding to formula (22) is selected from a plurality of gradation correction curves shown in FIG. 18(c). Or, the gradation correction curve may be selected (determined) based on the formula (22).

Meanwhile, the value of parameter P9 of the formula (22) is more than a predetermined value α, a curve corresponding to the curve whose key correction value is P9-α is selected from the curve L1-L5 illustrated in FIG. 21.

In the embodiment of the present invention, in case when practically applying a gradation correction process to the image data, respective image processing conditions are to be changed from 16 bit to 8 bit.

Meanwhile, in case when the gradation correction methods in front lighting, backlighting and strobe are largely different from each other, there is a little possibility of inference to the image quality due to the mis-determination of the photographic scene. Thus, a middle area is preferably provided so that the gradation correction method smoothly shifts between front lighting and backlighting and strobe.

Next, in FIG. 6, the face detection unit 733 and the face detection reliability calculation unit 734 execute a face detection process by using the reduced image data formed by the image reduction unit 709 (STEP S5).

Figure 22:
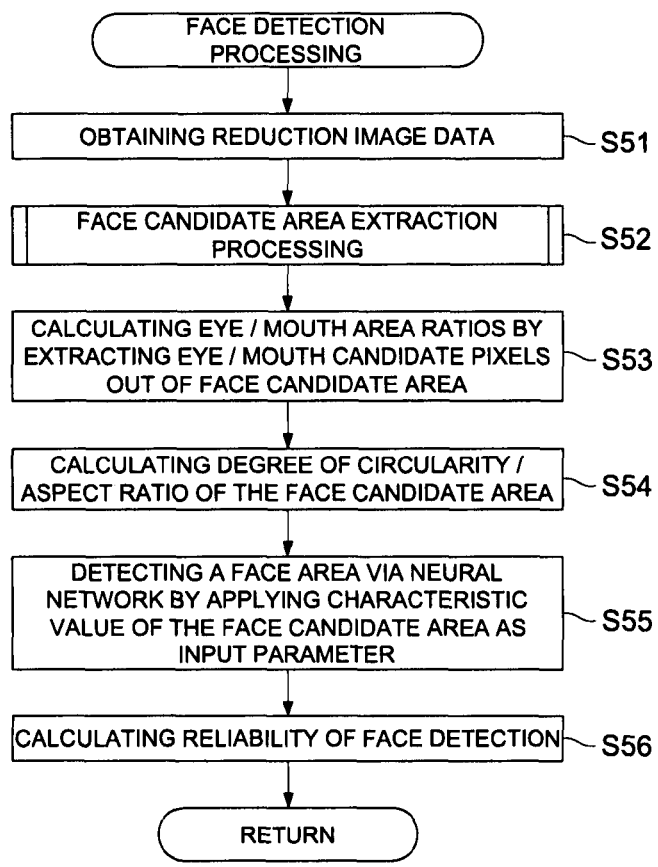
FIG. 22 illustrates a flowchart showing a face detection process under an image process.

FIG. 22 illustrates a flowchart showing a face detection process. As illustrated in FIG. 22, the face detection unit 733 obtains the reduced image data (STEP 51), and executes the face candidate area detection process based on the obtained reduced image data (STEP 52).

Figure 23:
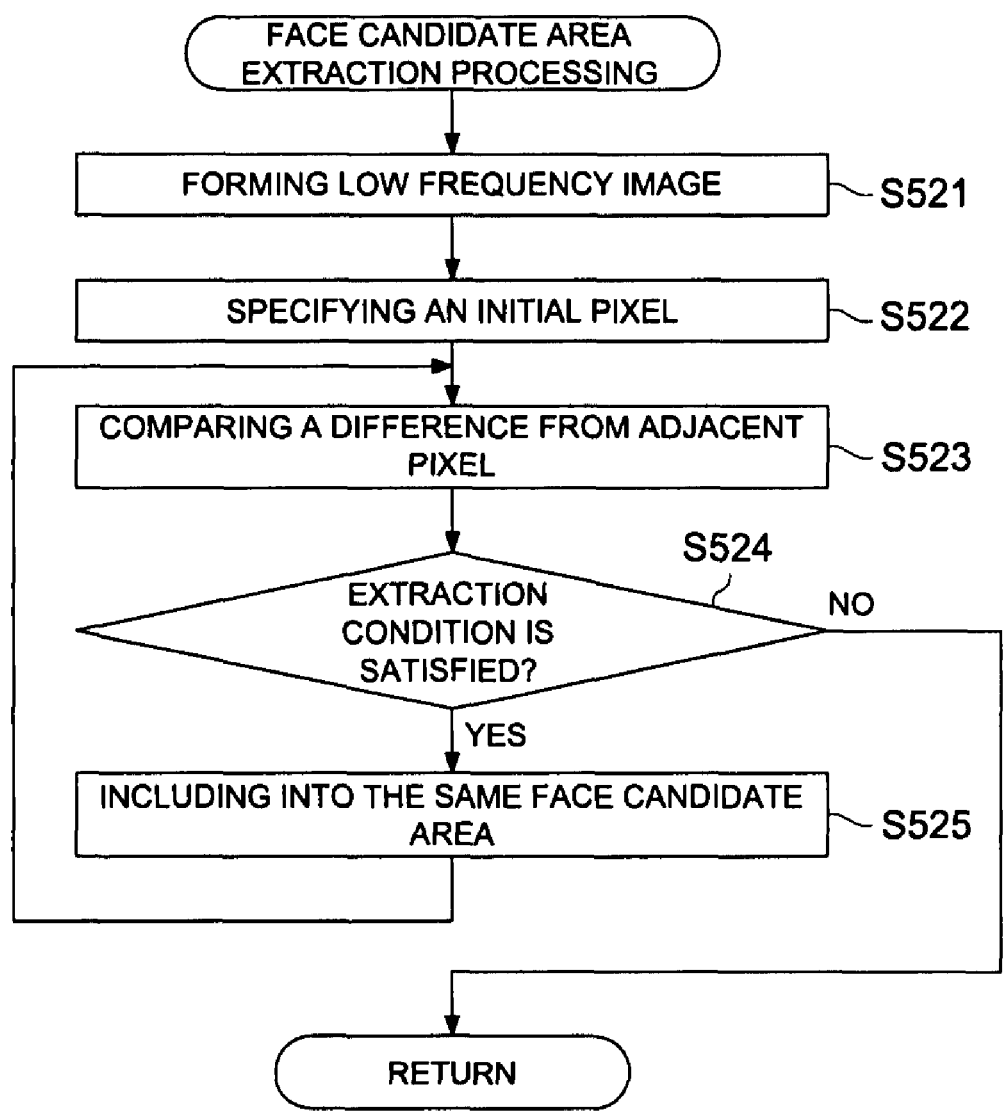
FIG. 23 illustrates a flowchart showing a face candidate extraction process of the face detection process.

FIG. 23 illustrates a flowchart showing a face candidate extraction process. Firstly, a low frequency image corresponding to the reduced image data is formed (STEP S521). The formation of the low frequency image can be conducted by using a publicly known low pass filter. However, it is preferable that low frequency components obtained by two-term wavelets conversion is used.

Next, by applying one extraction condition for discriminating and extracting the image signal expressing skin color against the low frequency image formed in the STEP S521, initial pixels (one or a plurality of pixels) is specified among the pixels of the image signal satisfying the extraction conditions (STEP S522). Then, the skin color area is extracted from the initial pixels by applying a simple area expansion method. The extraction conditions described above has been set in advance and is to be stored in the data storage unit 71 and internal memory of the image processing unit 7.

This extraction condition may be set based on the RGB value set in advance. Or, a user may specify a point (pixel) on the image and this extraction condition may be set based on the image signal of the specified pixel. At this moment, since human skin color has hue and saturation within a certain range under the same light source, the initial pixel is preferably selected based on the condition specifying the hue and the saturation. Further, the condition specifying the hue and the saturation is changed based on the kinds of light source when photographing. Further, the kinds of light source when photographing is preferably automatically discriminated by a publicly known method.

Next, the difference of the image signals of adjacent pixels is sequentially compared (STEP S523), and whether the image signals of the adjacent pixels satisfy the extraction condition or not is determined (STEP S524). In case when the image signals of the adjacent pixels satisfy the extraction condition (STEP S524:YES), the adjacent pixel is included to the same face candidate area (STEP S525). Here, the information expressing the respective positions (information to discriminate the pixel) of the pixels included in the face candidate area is sequentially stored into data storage unit 71 or the internal memory of the image processing unit 7.

Then, after STEP 525, the process described above moves to STEP S523, and repeats. On the process, in case when the image signal of the adjacent pixels does not satisfy the extraction condition (STEP S524: NO), the extraction process of the face candidate area utilizing the simple area expansion ends. Further, it may be feasible to have extracted the edge of an image in advance and the area expansion may ends with an edge portion.

Here, even the eyes and the mouth are formed in the face candidate area, they are not extracted as a part of skin area, which has been extracted based on the simple area extraction. Since the eyes and the mouth are included as a closed area, in case when the closed area is included as a part of the skin color area, which has been extracted based on the simple area extraction, it is preferable to process the area so as to include the closed area into the skin color hue area. Based on this arrangement, the eyes and the mouth can be included a skin color hue area extracted based on the simple area extraction.

With respect to the face candidate area extraction method, a method of extracting a special shape pattern, such as an oval shape by extracting edge from an image, a method of utilizing a pattern match and the combination thereof can be used.

Next, in FIG. 22, an eye candidate element and a mouth candidate element are extracted from the face candidate area (STEP S53). It is preferable that the extraction of the eye candidate element and the mouth candidate element is conducted by converting the image signal expressing the image of the face candidate area into luminance signal and color information signal, and using edge information expressing edge (a contour) extracted by using the luminance signal and the color information signal. The area rates of the eyes and the mouth are to be parameters for expressing the ratios of the number of pixels forming the eye candidate element and the mouth candidate element against the number of pixels forming the face candidate area. For example, the simplest one can be obtained by a formula (23) as following.

Area ratio=(number of pixels of extracted eyes or mouth)/(number of pixels forming face candidate area) (23)

Next, the roundness of the face candidate area and the aspect ratio are calculated (STEP S54)

Next, the face area is detected by the neural network for determining whether the face area candidate is a face or not by deeming that the characteristic values of the face candidate area, such as, the area ratio of the eyes and the mouth, the roundness and the aspect ratio are input parameters (STEP S55)

Then the face detection reliability calculation unit 734 calculates the face detection reliability (STEP S56) and the face detection process ends.

Next, in FIG. 6, the average luminance value of the face area detected by the face detection unit 733 is calculated by the second gradation correction amount decision unit 735. The second gradation amount is determined based on the differential value between the calculated average luminance vale and the target luminance value (STEP S6).

Next, the first gradation correction amount and the second gradation amount are weighted and averaged by the third gradation correction amount decision unit 763 (STEP S7). By putting that the first gradation correction amount and the second gradation correction amount are to be respectively weights w1 and w2 (0≦w1≦1, w2=1−w1), the third gradation correction amount is expressed by a following formula (24).

Third gradation correction amount=$w1 \times$(first gradation amount)+$w2 \times$(second gradation correction amount) (24)

Figure 24:
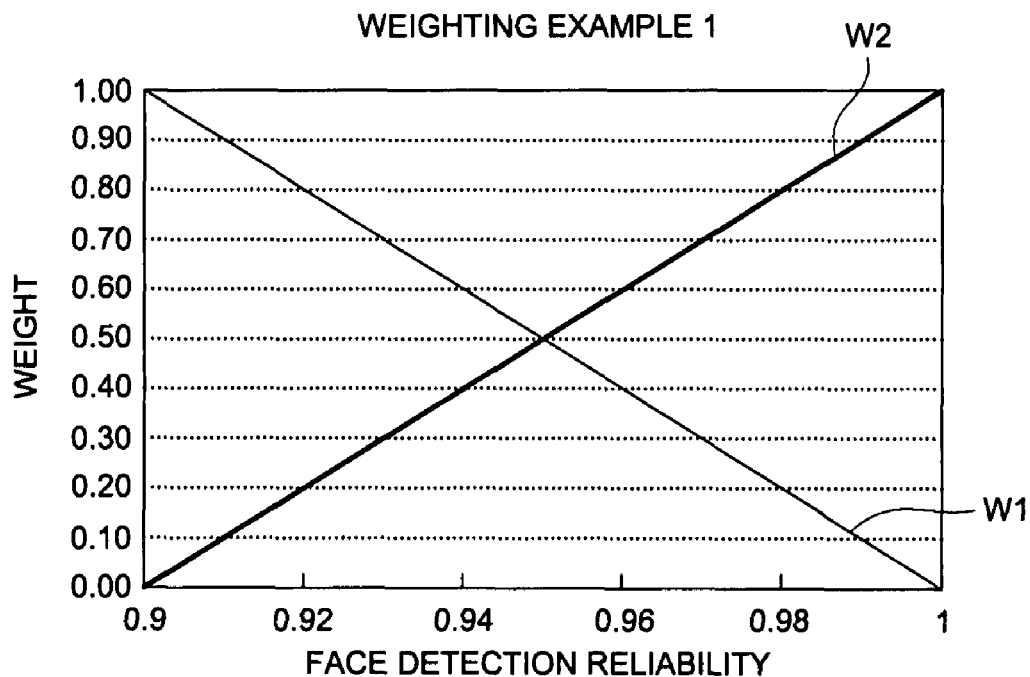
FIG. 24 illustrates a graph showing an example of weighting in case when determining the third gradation correction amount.
Figure 24:
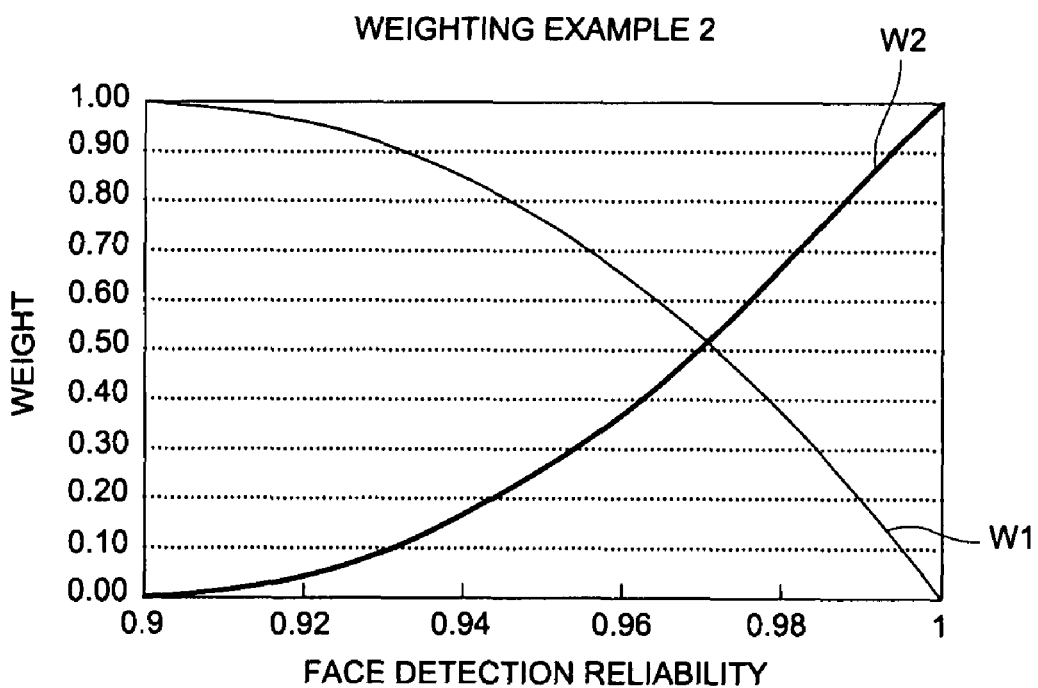

FIG. 24 illustrates a graph showing an example of weighting in case when determining the third gradation correction amount. Here, the output value of the neural network is to be the face detection reliability; in case when the output value is not more than 0.9, it is determined "definitely it is not a face"; and in case when the output value is within 0.9-1, it is determined that gradually from "face detection reliability is low" to "face detection reliability is high". The weighting example 1 illustrated in FIG. 24(*a*) is an example in case when the weightings W1 and w2 change corresponding to the face detection reliability. Since the second gradation correction amount is determined based on the average luminance of the face area, the second gradation correction amount is to be set high as the face detection reliability becomes high. In case when the face detection reliability is low, there is a possibility that the correction based the second gradation correction amount is not proper. Thus, the weight w1 against the first gradation correction amount based on the scene discrimination result is set to high. Meanwhile, the weights w1 and w2 corresponding to the first gradation correction amount and the second gradation correction amount are not limited these. The weights w1 and w2 may be set as shown in FIG. 24(*b*).

Next, the image process execution unit 737 applies the gradation correction process to original image data by using the third gradation correction method determined at STEP S4 and the gradation correction amount determined at STEP S7 (STEP S8). Further the image process execution unit 737 applies a noise reduction process, a sharpness enhancing process and the other image processes to the image data, to which the gradation correction process has been applied (STEP S9). Then the image processes end.

The image data, to which the image processes have been applied, is outputted to the CRT 8, the exposure processing unit 4, the external printer 34, the image transportation unit 31 and the communication unit (output) 33 via the CRT inherent processing unit 705, the print inherent processing unit (1) 706, the print inherent processing unit (2) 707 and the image data form creation processing unit 708.

According to embodiments of the present invention, since the weight of the first gradation correction amount based on the scene discrimination result and the weight of the second gradation correction amount based on the average brightness of a face area are changed based on the face detection reliability, regardless of the existence of a face in the image, a proper gradation correction can be executed to image data. Further, a processing time can be shortened by executing a scene discrimination process and a face detection process to image data by using reduced image data, to which the size of the image is reduced from original data.

Further, since the first index a1, the second index a2, the third index a3 and the fourth index a4, which express the photographic scene of the image data, are quantitatively calculated and the photographic scene is discriminated based on these indexes, the photographic scene of the image data can be accurately specifies.

Meanwhile, the present invention relates to examples of an image processing method, an image processing apparatus and an image processing program. However, the present invention is not limited to the above embodiments and various changes and modification may be made without departing from the scope of the invention.

For example, in the above embodiments, the reduced image data is to be used in the scene discrimination process and the face detection process. However, original data may be used instead of the reduced image data.

What is claimed is:

1. An image processing apparatus comprising:
   an obtaining unit for obtaining image data formed by signal of a plurality of pixels expressing a color image;
   a scene discrimination unit for discriminating a photographic scene from the image data;
      a gradation correction method decision unit for determining a gradation correction method based on a result of discriminating a photographic scene;
      a first gradation correction amount decision unit for determining a first gradation correction amount based on a result of discriminating a photographic scene;
      a face detection unit for detecting a face area in an image of the image data and calculating a face detection reliability;
      a second gradation correction amount decision unit for determining a second gradation correction amount based on an average luminance of the face area detected by the face detection unit;
      a third gradation correction amount decision unit for weighted averaging the first gradation correction amount and the second gradation correction amount based on the face detection reliability, and determining a third gradation correction amount; and
      a gradation correction processing unit for applying a gradation correction process to the image data by using the third gradation correction amount and the gradation method,
   wherein the scene discrimination unit comprises:
      a first occupancy rate calculation unit for dividing the image data into areas specified by combinations of predetermined brightness and hue, and calculating the first occupancy rate expressing a rate of the divided area against entire image data for the each divided area;

a first index calculation unit for calculating a first and a second indexes by multiplying predetermined first and second coefficients, which are different each other and set in advance, to the first occupancy rate;

a second occupancy calculation unit for dividing the image data into predetermined areas specified by combinations of predetermined distances from an external edge of a screen and brightness of the image data, and calculating second occupancy rates expressing the occupancy ratios of the predetermined areas against the entire image data for respective divided areas;

a second index calculation unit for calculating a third index by multiplying a predetermined third coefficient to the second occupancy rate;

a third index calculation unit for calculating a fourth index by multiplying a predetermined fourth coefficient at least to an average luminance of skin color in a center portion of a screen of the image data; and a discrimination unit for discriminating a photographic scene of the image data based on the first, second, third and fourth indexes, which have been calculated.

2. An image processing apparatus comprising:

an obtaining unit for obtaining a first image data formed by signals of a plurality of pixels expressing a color image;

an image reduction unit for forming a second image data by reducing an image size of the first image data;

a scene discrimination unit for discriminating a photographic scene of an image from the second image data;

a gradation correction method decision unit for determining a gradation correction method based on a result of discriminating a photographic scene;

a first gradation correction amount decision unit for determining a first gradation correction amount based on a result of discriminating a photographic scene;

a face detection unit for detecting a face area in an image of the second image data and calculating a face detection reliability;

a second gradation correction amount decision unit for determining a second gradation correction amount based on an average luminance of the face area detected by the face detection unit;

a third gradation correction amount decision unit for determining a third gradation correction amount by weighted averaging the first gradation correction amount and the second gradation correction amount based on the face detection reliability; and a gradation correction processing unit for applying a gradation correction process to the first image data by using the third gradation correction amount and the gradation method, wherein the scene discrimination unit comprises:

a first occupancy rate calculation unit for dividing the second image data into areas specified by combinations of predetermined brightness and hue, and calculating the first occupancy rate expressing a rate of the divided area against entire second image data for the each divided area a first index calculation unit for calculating a first and a second indexes by multiplying predetermined first and second coefficients, which are different each other and set in advance, to the first occupancy rate;

a second occupancy rate calculation unit for dividing the second image data into predetermined areas specified by combinations of predetermined distances from an external edge of a screen and brightness of the second image data, and calculating second occupancy rates expressing the occupancy ratios of the predetermined areas against the entire second image data for respective divided areas;

a second index calculation unit for calculating a third index by multiplying a predetermined third coefficient to the second occupancy rate;

a third index calculation unit for calculating a fourth index by multiplying a predetermined fourth coefficient at least to an average luminance of skin color in a center portion of a screen of the second image data; and a discrimination unit for discriminating a photographic scene of the second image data based on the first, second, third and fourth indexes, which have been calculated.

3. A computer readable medium recorded thereon an image processing program to allow computer to realize a gradation correction processing function comprising:

obtaining image data formed by signals of a plurality of pixels expressing a color image;

discriminating a photographic scene of an image from the image data;

determining a gradation correction method based on a result of the step of discriminating a photographic scene, determining a first gradation correction amount based on a result of the step of discriminating a photographic scene;

detecting a face by detecting a face area in an image of the image data and calculating a face detection reliability;

determining a second gradation correction amount based on an average luminance of the face area detected in the step of detecting a face;

determining a third gradation correction amount by weighted averaging the first gradation correction amount and the second gradation correction amount based on the face detection reliability; and applying a gradation correction process to the image data by using the third gradation correction amount and the gradation method, wherein the function of discriminating a photographic scene comprises:

calculating a first occupancy rate by dividing the image data into areas specified by combinations of predetermined brightness and hue, and calculating the first occupancy rate expressing a rate of the divided area against entire image data for the each divided area;

calculating a first and a second indexes by multiplying predetermined first and second coefficients, which are different each other and set in advance, to the first occupancy rate;

calculating second occupancy rates by dividing the image data into predetermined areas specified by combinations of predetermined distances from an external edge of a screen and brightness of the image data, and calculating second occupancy rates expressing the occupancy ratios of the predetermined areas against the entire image data for respective divided areas;

calculating a third index by multiplying a predetermined third coefficient to the second occupancy rate;

calculating a fourth index by multiplying a predetermined fourth coefficient at least to an average luminance of skin color in a center portion of a screen of the image data; and discriminating a photographic scene of the image data based on the first, second, third and fourth indexes, which have been calculated.

* * * * *